United States Patent
Tsunoda et al.

(10) Patent No.: US 7,062,109 B2
(45) Date of Patent: Jun. 13, 2006

(54) ACOUSTO-OPTIC DEVICE

(75) Inventors: Yukito Tsunoda, Kawasaki (JP); Hiroshi Miyata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/954,305

(22) Filed: Oct. 1, 2004

(65) Prior Publication Data
US 2005/0286826 A1   Dec. 29, 2005

(30) Foreign Application Priority Data
Jun. 25, 2004   (JP) .............................. 2004-187511

(51) Int. Cl.
*G02F 1/335* (2006.01)

(52) U.S. Cl. .............................................. 385/7; 358/4

(58) Field of Classification Search .................... 385/4, 385/7, 11
See application file for complete search history.

(56) References Cited

U.S. PATENT DOCUMENTS

| 5,218,653 A | 6/1993 | Johnson et al. ............... 385/11 |
| 6,400,881 B1 * | 6/2002 | Seino et al. ................. 385/130 |
| 6,697,543 B1 * | 2/2004 | Miyata et al. ................ 385/11 |

\* cited by examiner

*Primary Examiner*—Sarah Song
(74) *Attorney, Agent, or Firm*—Staas & Halsey LLP

(57) ABSTRACT

The present invention relates to an acousto-optic device capable of improving the interaction efficiency for suppressing the driving power needed for SAW generation. The acousto-optic device according to the present invention a substrate showing an acousto-optic effect, first and second optical waveguides formed on the substrate to be substantially parallel with each other for propagating light, a transducer formed on the substrate for producing a surface acoustic wave to be propagated in a propagation direction along directions of the first and second optical waveguides, and a surface acoustic wave distribution structure for distributing an intensity of the surface acoustic wave from the transducer in a direction perpendicular to the propagation direction on the substrate so that maximum values develop at two points corresponding to positions of the first and second optical waveguides.

19 Claims, 13 Drawing Sheets

ACOUSTO-OPTIC DEVICE

BACKGROUND OF THE INVENTION

1) Field of the Invention

The present invention relates to an acousto-optic device suitable for use in an optical communication system.

2) Description of the Related Art

An acousto-optical device is a device utilizing an acousto-optic effect that light is diffracted according to a refractive index profile in a substance induced upon receipt of an ultrasonic wave and, for example, includes an AOTF (Acousto-Optic Tunable Filter). In addition to the application to an OADM (Optical Add-Drop Multiplexer) in a WDM (Wavelength Division Multiplexing, wavelength multiplexed) optical communication system, this AOTF is expected to be available for an optical cross connect, an optical switch, an optical modulation and others.

The AOTF is a wavelength filter using the TE–TM mode conversion stemming from the acousto-optic effect which is the interaction between light in a waveguide made in a piezoelectric material such as an $LiNbO_3$ (lithium niobate) substrate (sometimes, which will hereinafter be referred to simply as an "LN substrate") and an SAW (Surface Acoustic Wave) applied thereonto.

FIG. 25 is a top view illustratively showing an example of a configuration of a common AOTF. This AOTF, generally designated at reference numeral 100, is equipped with polarization beam splitters 102 and 104 formed at former and latter stages in an interactional area on an LN substrate 101 and a mode converter 103 serving as the aforesaid interactional area and comprised of two optical waveguides 103a-1, 103a-2 and a SAW guide 103b acting as a SAW waveguide and formed thereon as a thin film. In addition, formed is a comb-like electrode (IDT: Inter Digit Transducer) 105 capable of, when an ultrasonic wave signal is applied thereto, producing a SAW which is propagated through the SAW guide 103b.

In the AOTF with this configuration, the input-side polarization beam splitter 102 splits the inputted light into TE light and TM light, and the optical waveguides 103a- and 103a-2 constituting the mode converter 103 separately carries out the TE/TM mode conversion on only a light with a specific wavelength through the use of the SAW from the comb-like electrode 105, with they being multiplexed in the output side polarization beam splitter 104. This realizes the polarization-non-dependency of the device characteristic.

Although the mode conversion in the AOTF 100 shown in FIG. 25 is made in the separate waveguides 103a-1 and 103a-2 according to the polarization component for the purpose of realizing the polarization non-dependency, for the mode conversion, there is a need to use the SAWs having the same characteristic with respect to these waveguides 103a-1 and 103a-2. In the aforesaid AOTF 100 shown in FIG. 25, as the SAW to be applied to the optical waveguides 103a-1 and 103a-2, a SAW stemming from an ultrasonic wave to be applied to the transducer 105 is used in common.

As a well-known technique associated with the present invention, there is a technique disclosed in the patent document U.S. Pat. No. 5,218,653. This patent document discloses a technique of dividing an acoustic waveguide by a gap so that the two acoustic waveguides operate as an oriented coupler.

However, in the aforesaid AOTF 100 shown in FIG. 25, the SAW intensity distribution in a direction perpendicular to the SAW propagation direction shows a waveform having a single maximum point in an area interposed between the optical waveguides 103a-1 and 103a-2 as shown in FIG. 26. Therefore, of the intensity of the SAW to be produced by an ultrasonic wave signal applied to the transducer 105, a relatively low portion is used in the vicinity of the optical waveguides 103a-1 and 103a-2, and the interaction is remote from a high efficiency, which leads to an increase in driving power for the generation of the SAW.

SUMMARY OF THE INVENTION

The present invention has been developed with a view to eliminating these problems, and it is therefore an object of the invention to provide an acousto-optic device capable of improving the interaction efficiency and suppressing the driving power taken for the generation of the SAW.

For this purpose, in accordance with an aspect of the present invention, there is provided an acousto-optic device comprising a substrate showing an acousto-optic effect, first and second optical waveguides formed on the substrate to be substantially parallel with each other for propagating light and a transducer formed on the substrate for producing a surface acoustic wave propagated in a propagation direction along directions of the first and second optical waveguides, and having a surface acoustic wave distribution structure for distributing an intensity of the surface acoustic wave from said transducer in a direction perpendicular to the propagation direction on the substrate so that maximum values appear at two points corresponding to positions of the first and second optical waveguides.

In addition, preferably, the surface acoustic wave distribution structure is made such that a speed of the surface acoustic wave propagated in first and second areas respectively including areas where the first and second optical waveguides are formed becomes lower than a speed of the surface acoustic wave propagated in a third area interposed between the first and second areas and a speed of the surface acoustic wave propagated in the first and second areas becomes lower than a speed of the surface acoustic wave propagated in both side areas lying with respect to the first and second areas.

Still additionally, it is also appropriate that the surface acoustic wave distribution structure is made such that the transducer includes a first pectinate (comb-teeth-like) electrode pair for making a first surface acoustic wave propagated in the first area and a second pectinate electrode pair for making a second surface acoustic wave propagated in the second area.

Yet additionally, it is also appropriate that the acousto-optic device further comprises a first polarization splitting element made to split a light from at least one input port into two polarized waves for outputting the split lights to the first and second optical waveguides and a second polarization splitting element made to receive lights from the first and second optical waveguides for splitting the lights from the first and second optical waveguides into two polarized waves and outputting them.

Furthermore, in accordance with another aspect of the present invention, there is provided an acousto-optic device comprising a substrate showing an acousto-optic effect, a plurality of optical waveguides formed on the substrate to be substantially parallel with each other for propagating light and a transducer formed on the substrate for producing a surface acoustic wave propagated in a propagation direction along directions of the plurality of optical waveguides, and having a surface acoustic wave distribution structure for distributing an intensity of the surface acoustic wave from the transducer in a direction perpendicular to the propagation direction on the substrate so that a maximum value develops at a point corresponding to each of positions of the plurality of optical waveguides.

As described above, the surface acoustic wave distribution structure can distribute the intensity of the surface acoustic wave in a direction perpendicular to the propagation direction thereof on the substrate so that maximum values appear at two points corresponding to the positions of the first end second optical waveguides, which improves the interaction efficiency and suppresses the driving power needed for the generation of the SAW so that the dissipation power is reducible.

The above and other objects, features and advantageous of the present invention will become apparent from the following description and the appended claims, taken in conjunction with the accompanying drawings in which like parts or elements are denoted by like reference characters.

DESCRIPTION OF THE PREFERRED EMBODIMENTS

Embodiments of the present invention will be described in detail hereinbelow with reference to the drawings.

[A1] Description of First Embodiment

Figure 1:
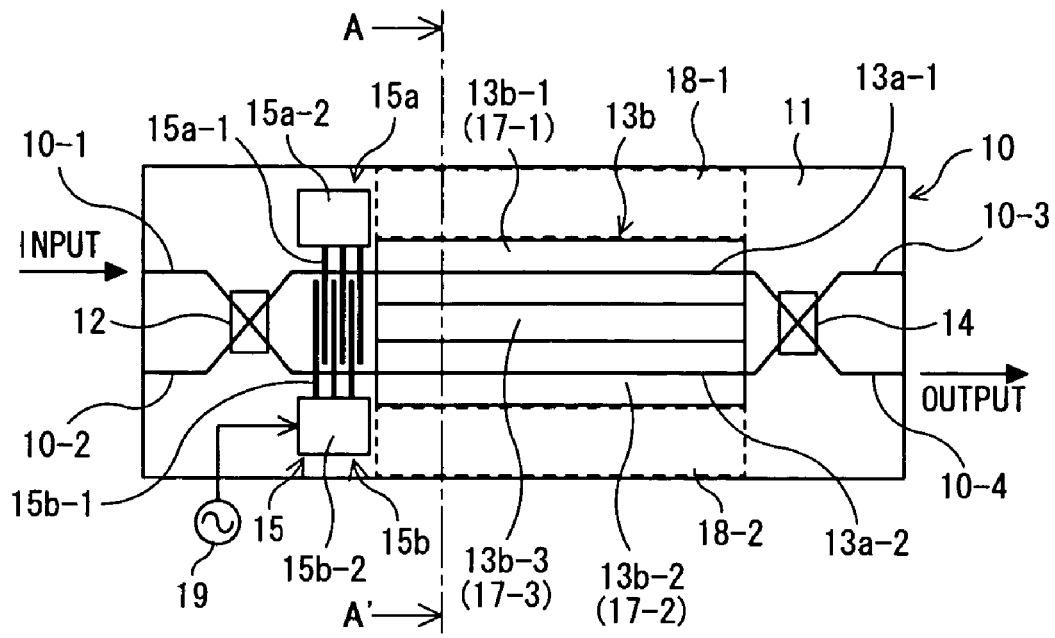
FIG. 1 is a top view illustratively showing an acousto-optic device according to a first embodiment of the present invention.

FIG. 1 is a top view illustratively showing an acousto-optic device according to a first embodiment of the present invention. In FIG. 1, the acousto-optic device 10 is equipped with a substrate 11 such as an LN substrate having an acousto-optic effect, and on a surface of this substrate 11, there are formed polarization beam splitters 12, 14 and optical waveguides 13a-1, 13a-2 and, further, on the substrate 11, there are formed a SAW guide 13b and a transducer 15. In the illustration, numeral 19 denotes an electric signal source for supplying an electric signal to the transducer 15.

In this configuration, the polarization beam splitter 12 functions as a first polarization splitting element capable of splitting a light from at least one input port 10-1 of two input ports 10-1 and 10-2 provided in the acousto-optic device 10 into two polarized waves (for example, TE light and TM light) to output the split lights to the optical waveguides 13a-1 and 13a-2. In this case, the light from the input port 10-1 is split into the TE light and the TM light in the polarization beam splitter 12, with the TE light being outputted to the optical waveguide 13a-2 and the TM light being outputted to the optical waveguide 13a-1.

In addition, the optical waveguides 13a-1 and 13a-2 are made by diffusing titanium or the like, and form substantially parallel straight waveguides. Still additionally, they propagate the lights polarization-split in the polarization splitter 12, respectively, and output the lights to the polarization beam splitter 14.

Moreover, the polarization beam splitter 14 functions as a second polarization splitting element to receive the lights from the optical waveguides 13a-1 and 13a-2 for splitting the lights the aforesaid first and second optical waveguides into two polarized waves (splitting in the outputting direction prescribed for each polarized wave) and outputting them. Concretely, in the polarization beam splitter 14, the TE light inputted from the optical waveguide 13a-1 can be outputted to an output port 10-4 of two output ports 10-3 and 10-4 provided in the acousto-optic device 10 while the TM light inputted from the optical waveguide 13a-2 can be outputted to the output port 10-4. Likewise, the TE light inputted from the optical waveguide 13a-2 is outputted to the output port 10-3 while the TM light inputted from the optical waveguide 13a-1 is outputted to the output port 10-3.

The transducer 15 is for producing a surface acoustic wave (SAW) to be propagated at an equal intensity in first and second areas 17-1 and 17-2 respectively including the optical waveguides 13a-1 and 13a-2 in a propagation direction along the directions of the optical waveguides 13a-1 and 13a-2, and includes pectinate electrode units 15a and 15b respectively equipped with base electrodes 15a-2 and 15b-2 forming the roots of tooth electrodes 15a-1, 15b-1 and tooth electrodes 15a-1, 15b-1 located in opposed relation to each other to engage with each other.

When a voltage signal having an ultrasonic frequency is applied from the electric signal source 19 to the pectinate electrode units 15a and 15b, the SAW is propagated through the characteristic SAW guide 13b in the first embodiment which will be described later. The refractive index profiles of the optical waveguides 13a-1 and 13a-2 vary by the SAW propagated through the aforesaid SAW guide 13b, thus switching the mode of the light propagated in the optical waveguides 13a-1 and 13a-2.

For example, owing to the SAW produced by a voltage signal applied to the transducer 15 and propagated through the SAW guide 13b, the TM light propagated through the optical waveguide 13a-1 is mode-switched into the TE light while the TE light is mode-switched into the TM light. Likewise, the TE light propagated through the optical waveguide 13a-2 is mode-switched into the TM light while the TM light is mode-switched into the TE light.

Figure 2:
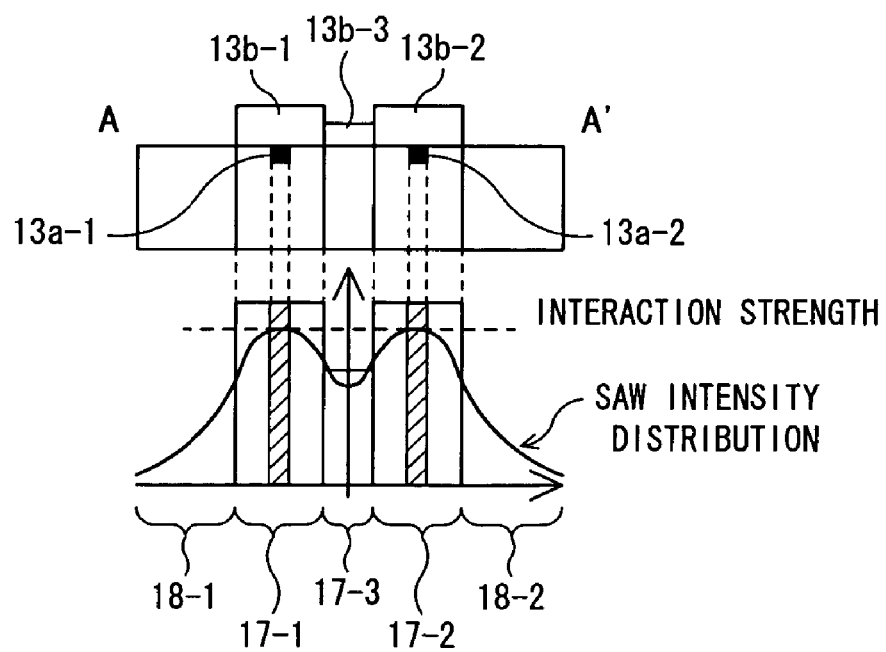
FIG. 2 is an illustration useful for explaining the operations and effects of the acousto-optic device according to the first embodiment of the present invention.

FIG. 2 is a cross-sectional view taken along an arrow line A–A' of FIG. 1 showing the acousto-optic device 10 and is an illustration of an intensity distribution of a surface acoustic wave from the transducer 15 in a direction perpendicular to the propagation direction on the substrate 11. The SAW guide 13b is made in a manner such that, for example, thin films 13b-1 to 13b-3 are formed on the substrate 11 as shown in FIG. 2. The thin films 13b-1 and 13b-2 are formed in the first and second areas 17-1 and 17-2 including the areas of formation of the optical waveguides 13a-1 and 13a-2 on the substrate 11, respectively, where the propagation speed (or velocity) of the surface acoustic wave can be set to be lower than that in a third area 17-3 interposed between the first and second areas 17-1 and 17-2.

Moreover, the thin film 13b-3 is formed in the aforesaid third area 17-3 and is made to be smaller in thickness than the thin films 13b-1 and 13b-2 formed in the first and second areas 17-1 and 17-2. In this connection, the aforesaid thin films 13b-1 to 13b-3 can have the same material and, therefor, it is preferable to use a material made by doping silicon dioxide, which is lower in SAW propagation speed than LN, with indium or tin. In addition, the thin films 13b-1 to 13b-3 can also be made using well-known materials which are lower in SAW propagation speed than an LN substrate.

In general, the factor for the determination of the SAW propagation speed depends upon the hardness and weight of a substance acting as a SAW guide provided on the substrate 11. That is, when the SAW guide is harder than the substrate 11, the SAW propagation speed becomes relatively high, and when the SAW guide is softer than the substrate 11, the SAW propagation speed becomes relatively low. Moreover, when a portion serving as the SAW guide provided on the substrate 11 is lighter, the SAW propagation speed becomes relatively high, and when the portion serving as the SAW guide is more weighty, the SAW propagation speed becomes relatively low.

In this case, the thickness of the thin film 13b-3 is made to be thinner than those of the thin films 13b-1 and 13b-2 and, hence, the thin film 13b-3 portion becomes lighter than the thin films 13b-1 and 13b-2 so that the SAW propagation speed therein becomes relatively higher than those in the thin films 13b-1 and 13b-2.

Therefore, with respect to the SAW, the propagation speed in the first and second areas 17-1 and 17-2 respectively including the areas of the formation of the optical waveguides 13a-1 and 13a-2 becomes lower than the propagation speed in the third area 17-3 interposed between the first and second areas 17-1 and 17-2, and with respect to the SAW, the propagation speed in the first and second areas 17-1 and 17-2 becomes lower than the propagation speed in both-side areas 18-1 and 18-2 (areas in which the thin films 13b-1 to 13b-3 are not formed, i.e., in which no thin film is formed) lying with respect to the first and second areas 17-1 and 17-2.

In addition, since the thin films 13b-1 to 13b-3 enable the propagation speed at which the SAW propagates in the first and second areas 17-1 and 17-2 to be lower than the propagation speed in the third area 17-3, there is the effect that the SAW is confined in the low-propagation-speed areas 17-1 and 17-2 and, as shown in FIG. 2, the intensity distribution of the surface acoustic wave can be made so that two points corresponding to the positions of the optical waveguides 13a-1 and 13a-2 become at a maximum. In other words, the aforesaid thin films 13b-1 to 13b-3 constitute a surface acoustic wave distribution structure.

In other words, with respect to the propagation speed of the SAW, a speed difference is made in a direction perpendicular to the propagation direction on the substrate 11 so that the propagation speed in the first and second areas 17-1 and 17-2 becomes lower than the propagation speed in their peripheral areas 17-3, 18-1 and 18-2, thereby making a distribution in which the intensity of the SAW in the direction perpendicular to the propagation direction on the substrate 11 shows a maximum point in each of the first and second areas 17-1 and 17-2.

With the above-described structure, in the acousto-optic device 10 according to the first embodiment of the present invention, the light split into the TE light and the TM light in the polarization beam splitter 12 is propagated through the optical waveguide 13a-1 or the optical waveguide 13a-2. At this time, when a voltage signal with an ultrasonic frequency is applied to the transducer 15, the TE light can be converted into the TM light and the TM light can be converted into the TE light.

For example, when the acousto-optic device 10 is applied as an OADM, the frequency of the voltage signal to be applied to the transducer 15 is changed so that, with respect to a wavelength-multiplexed light inputted from the input port 10-1, the aforesaid mode conversion is made on only a light of a wavelength channel to be taken out from the output port 10-4. Accordingly, the light of a wavelength channel which does not undergo the mode conversion is outputted through the output port 10-3, while the light of the wavelength channel mode-converted is dropped through the output port 10-4.

At this time, since, through the use of the SAW guide 13*b* comprised of the thin films 13*b*-1 to 13*b*-3, the intensity distribution of the surface acoustic wave can be made such that a maximum value appears at each of two points corresponding to the positions of the optical waveguides 13*a*-1 and 13*a*-2, the SAW needed for the mode conversion in the optical waveguides 13*a*-1 and 13*a*-2 is obtainable by supplying a voltage signal lower in voltage than conventional voltage signal to the transducer 15.

As described above, with the acousto-optic device 10 according to the first embodiment of the present invention, as a surface acoustic wave distribution structure, the SAW guide 13*b* is provided which is comprised of the thin films 13*b*-1 to 13*b*-3, which enhances the interaction efficiency and suppresses the driving power for the generation of a SAW so that the reduction of dissipation power is achievable.

[A2] Description of Modification of First Embodiment

Figure 3:
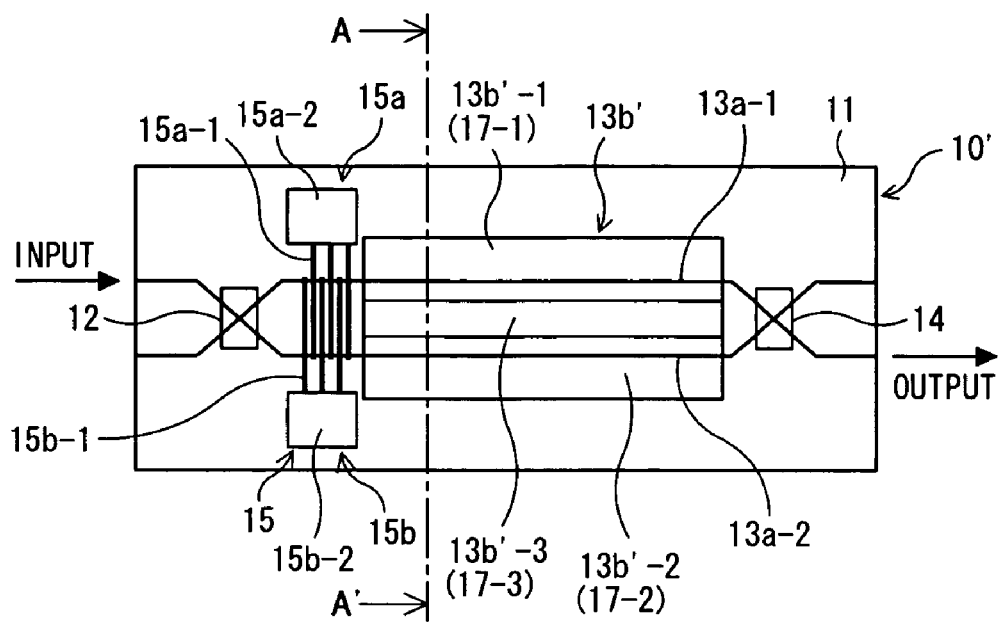
FIG. 3 is a top view illustratively showing an acousto-optic device according to a modification of the first embodiment of the present invention.
Figure 4:
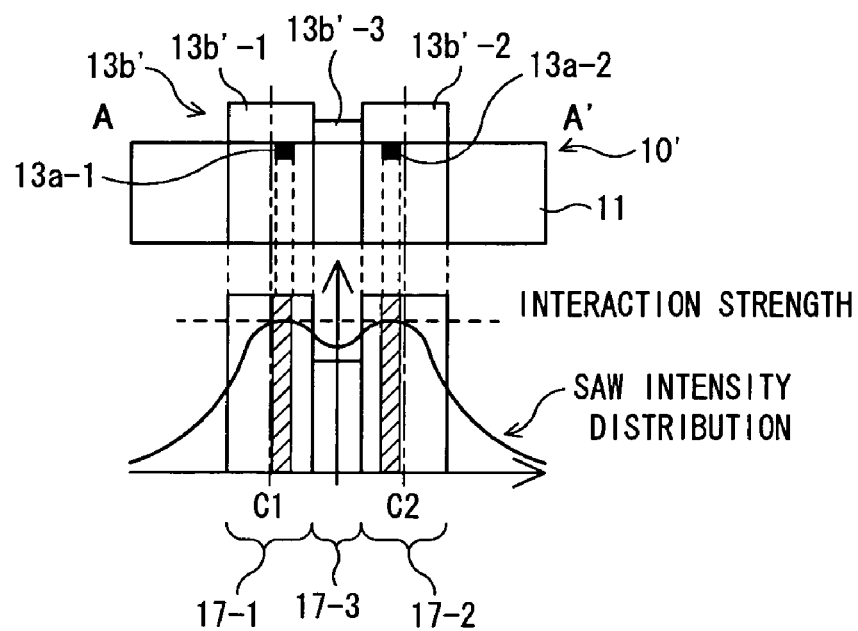
FIG. 4 is an illustration useful for explaining the operations and effects of the acousto-optic device according to the modification of the first embodiment of the present invention.

FIGS. 3 and 4 are illustrations of an acousto-optic device 10' according to a modification of the first embodiment of the present invention. FIG. 3 is a top view illustratively showing the acousto-optic device 10', and FIG. 4 is a cross-sectional view taken along an arrow line A–A' of FIG. 3 showing the acousto-optic device 10' and is an illustration of an intensity distribution of a surface acoustic wave from the transducer 15 in a direction perpendicular to the propagation direction on the substrate 11, and corresponds to FIG. 2 showing the first embodiment. In FIGS. 3 and 4, the same reference numerals as those in FIGS. 1 and 2 designate the same components.

Although the acousto-optic device 10 according to the first embodiment is made such that the thin films 13*b*-1 and 13*b*-2 constituting the SAW guide 13*b* are made in a state where the formation positions of the optical waveguides 13*a*-1 and 13*a*-2 are taken as central axes, it is also appropriate that, as shown in FIGS. 3 and 4, thin films 13*b*'-1 and 13*b*'-2 constituting the SAW guide 13*b* are made in a state where positions shifted from the positions of the optical waveguides 13*a*-1 and 13*a*-2 to the inside or the outside (in this case, the outside) are set at central axes C1 and C2. In other words, if the SAW can efficiently be supplied to the optical waveguides 13*a*-1 and 13*a*-2, the thin films 13*b*'-1 and 13*b*'-2 can be formed without placing the formation positions of the optical waveguides 13*a*-1 and 13*a*-2 at the centers.

Figure 6:
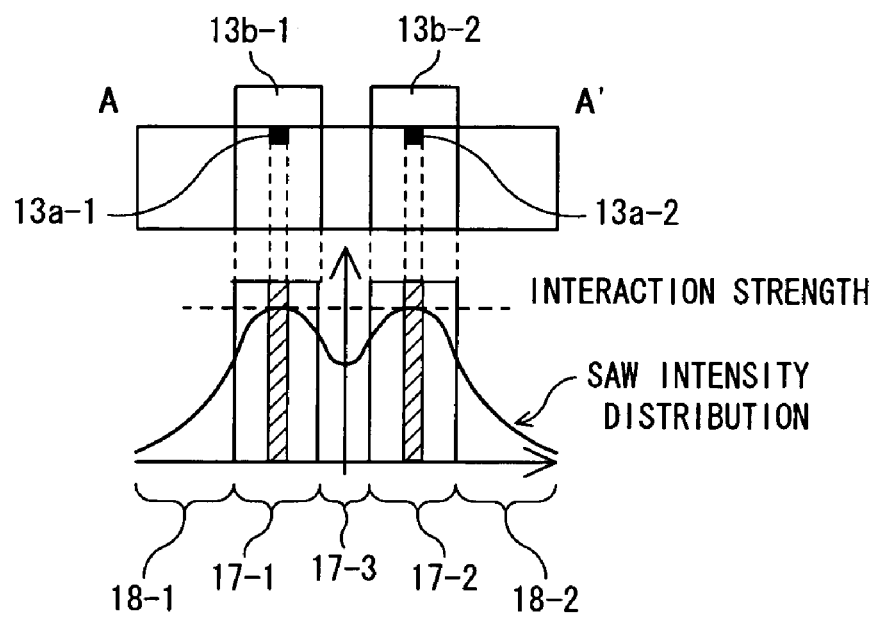
FIG. 6 is an illustration useful for explaining the operations and effects of the acousto-optic device according to the second embodiment of the present invention.

Also in this case, as shown in FIG. 6, the SAW intensity distribution can be made so that two maximum points are formed at the positions corresponding to the optical waveguides 13*a*-1 and 13*a*-2, thus providing advantages similar to those of the above-described first embodiment.

[B1] Description of Second Embodiment

Figure 5:
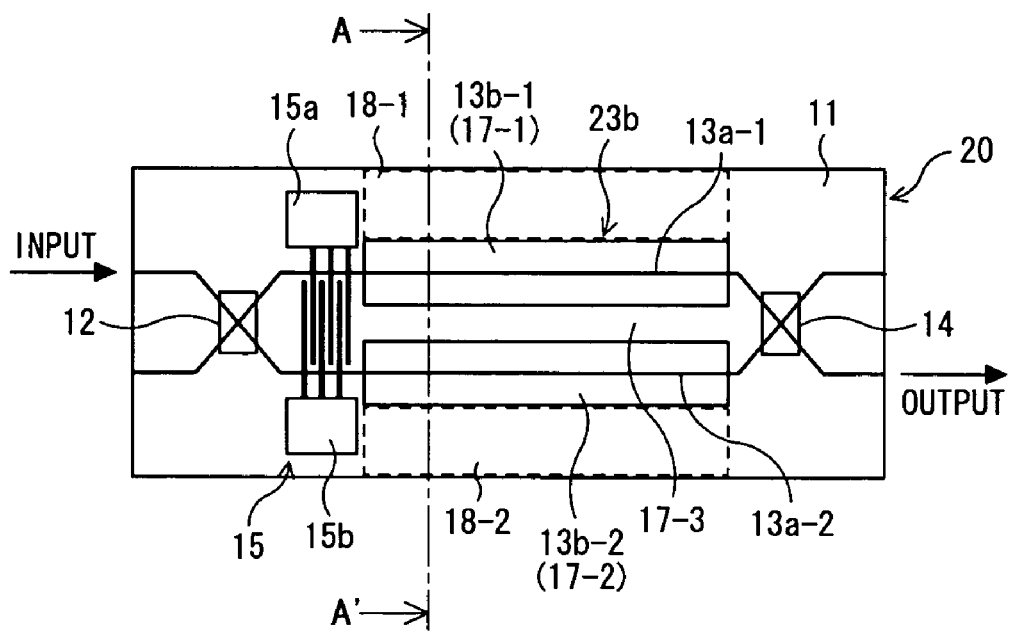
FIG. 5 is a top view illustratively showing an acousto-optic device according to a second embodiment of the present invention.

FIGS. 5 and 6 are illustrations of an acousto-optic device 20 according to a second embodiment of the present invention. FIG. 5 is a top view illustratively showing the acousto-optic device 20, and FIG. 6 is a cross-sectional view taken along an arrow line A–A' of FIG. 5 showing the acousto-optic device 20 and is an illustration of an intensity distribution of a surface acoustic wave from the transducer 15 in a direction perpendicular to the propagation direction on the substrate 11, and corresponds to FIG. 2 showing the first embodiment. In FIGS. 5 and 6, the same reference numerals as those in FIGS. 1 and 2 designate the almost same components.

In comparison with the above-described first embodiment, although adopting a common position in that the SAW propagation speed in the first and second areas 17-1 and 17-2 including the formation areas of the optical waveguides 13*a*-1 and 13*a*-2 is made to be lower than the propagation speed in the areas 17-3, 18-1 and 18-2 to make a difference in acoustic speed (acoustic velocity) therebetween, the acousto-optic device 20 according to the second embodiment has a structure of a third area 17-3 different therefrom.

Therefore, although the thin films 13*b*-1 and 13*b*-2 are formed for an SAW guide (surface acoustic wave distribution structure) 23*b* as well as the above-described acousto-optic device 10 according to the first embodiment, the acousto-optic device 20 according to the second embodiment differs from the acousto-optic device 10 in that a thin film 13*b*-3 is not formed in the third area 17-3.

In this case, the SAW propagation speed in the third area 17-3 becomes the propagation speed in the substrate 10 (that is, LN) and, hence, it becomes higher than the propagation speed in the thin films 13*b*-1 and 13*b*-2 formed in the first and second areas 17-1 and 17-2. Incidentally, since no thin film is formed in the outside areas 18-1 and 18-2 relative to the first and second areas 17-1 and 17-2, the SAW propagation speed in these areas 18-1 and 18-2 is similar to that in the third area 17-3.

In other words, also in the acousto-optic device 20 according to the second embodiment, the speed at which the surface acoustic wave is propagated in the first and second areas 17-1 and 17-2 respectively including the areas of the formation of the optical waveguides 13*a*-1 and 13*a*-2 is set to become lower than the speed at which it is propagated in the third area 17-3 interposed between the first and second areas 17-1 and 17-2, and the speed at which the surface acoustic wave is propagated in the first and second areas 17-1 and 17-2 becomes lower than the speed at which it is propagated in the both-side areas 18-1 and 18-2 relative to the first and second areas 17-1 and 17-2.

Therefore, also in the acousto-optic device 20 according to the second embodiment, owing to the thin films 13*b*-1 and 13*b*-2 being formed as a surface acoustic wave distribution structure, the SAW intensity distribution can be made so that two maximum points are formed at the positions corresponding to the optical waveguides 13*a*-1 and 13*a*-2, thus providing advantages similar to those of the above-described first embodiment.

[B2] Description of Modification of Second Embodiment

Figure 7:
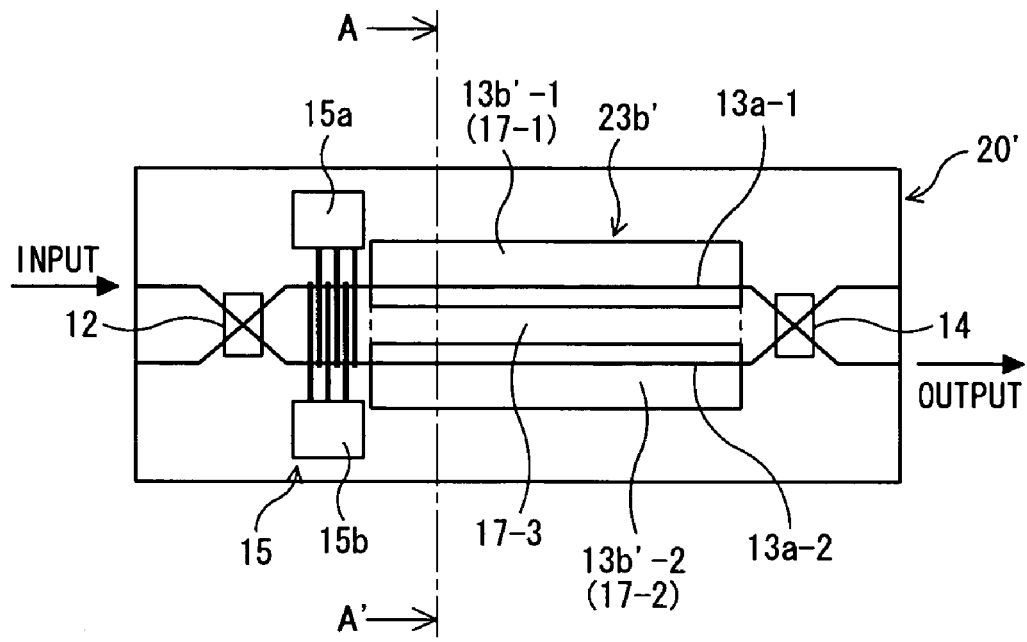
FIG. 7 is a top view illustratively showing an acousto-optic device according to a modification of the second embodiment of the present invention.
Figure 8:
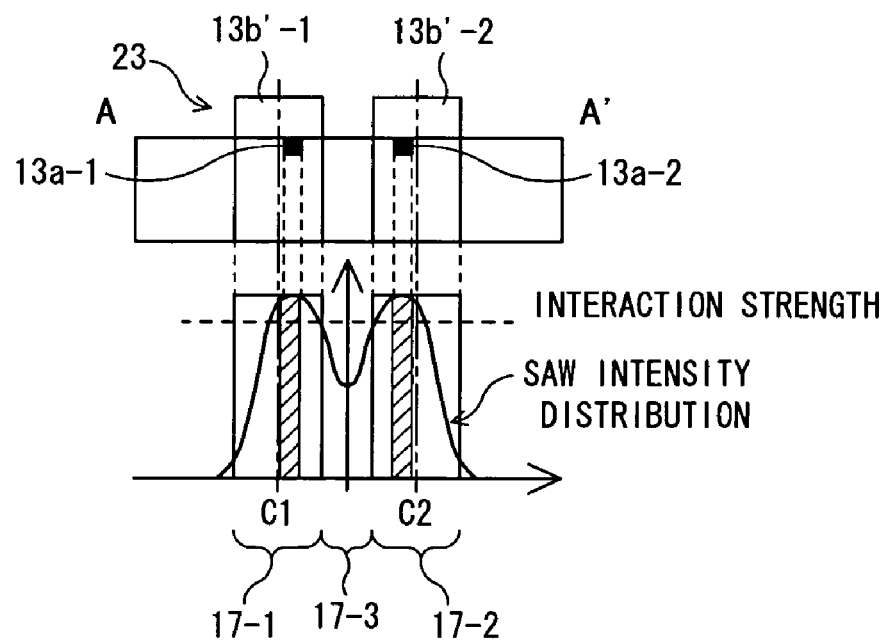
FIG. 8 is an illustration useful for explaining the operations and effects of the acousto-optic device according to the modification of the second embodiment of the present invention.

FIGS. 7 and 8 are illustrations of an acousto-optic device 20' according to a modification of the second embodiment of the present invention. FIG. 7 is a top view illustratively showing the acousto-optic device 20', and FIG. 8 is a cross-sectional view taken along an arrow line A–A' of FIG. 7 showing the acousto-optic device 20' and is an illustration of an intensity distribution of a surface acoustic wave from the transducer 15 in a direction perpendicular to the propagation direction on the substrate 11, and corresponds to FIG.

6 showing the second embodiment. In FIGS. 7 and 8, the same reference numerals as those in FIGS. 5 and 6 designate the same components.

Although in the acousto-optic device 20 according to the second embodiment the thin films 13b-1 and 13b-2 constituting the SAW guide 23b are made in a state where the formation positions of the optical waveguides 13a-1 and 13a-2 are taken as central axes, it is also appropriate that, as shown in FIGS. 7 and 8, thin films 13b'-1 and 13b'-2 constituting the SAW guide 23b' are made in a state where positions shifted from the positions of the optical waveguides 13a-1 and 13a-2 to the inside or the outside (in this case, the outside) are set at central axes C1 and C2. In other words, if the SAW can efficiently be supplied to the optical waveguides 13a-1 and 13a-2, the thin films 13b'-1 and 13b'-2 can be formed without setting the formation positions of the optical waveguides 13a-1 and 13a-2 at the centers.

Also in this case, as shown in FIG. 8, the SAW intensity distribution can be made so that two maximum points are formed at the positions corresponding to the optical waveguides 13a-1 and 13a-2, thus providing advantages similar to those of the above-described second embodiment.

[C1] Description of Third Embodiment

Figure 9:
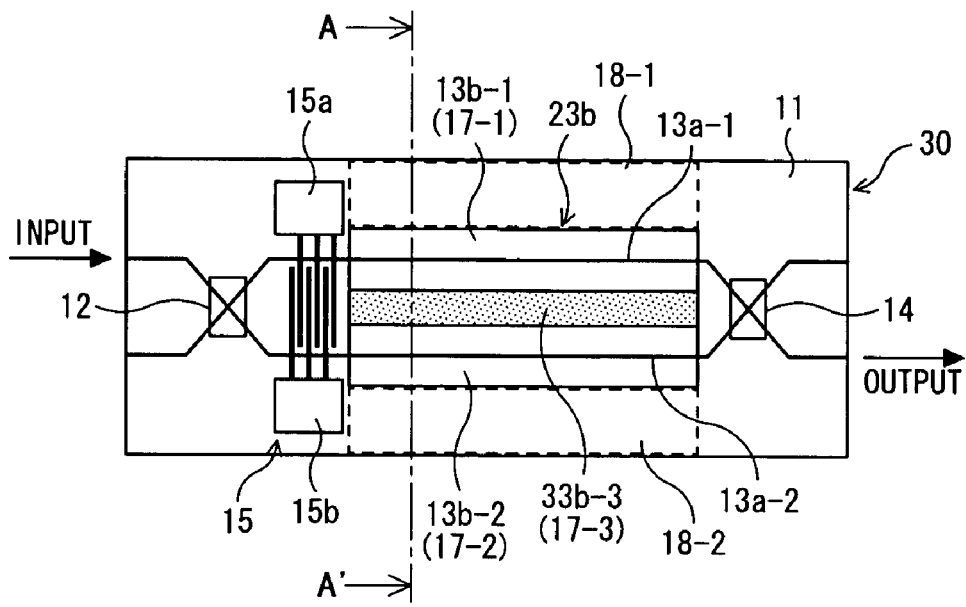
FIG. 9 is a top view illustratively showing an acousto-optic device according to a third embodiment of the present invention.
Figure 10:
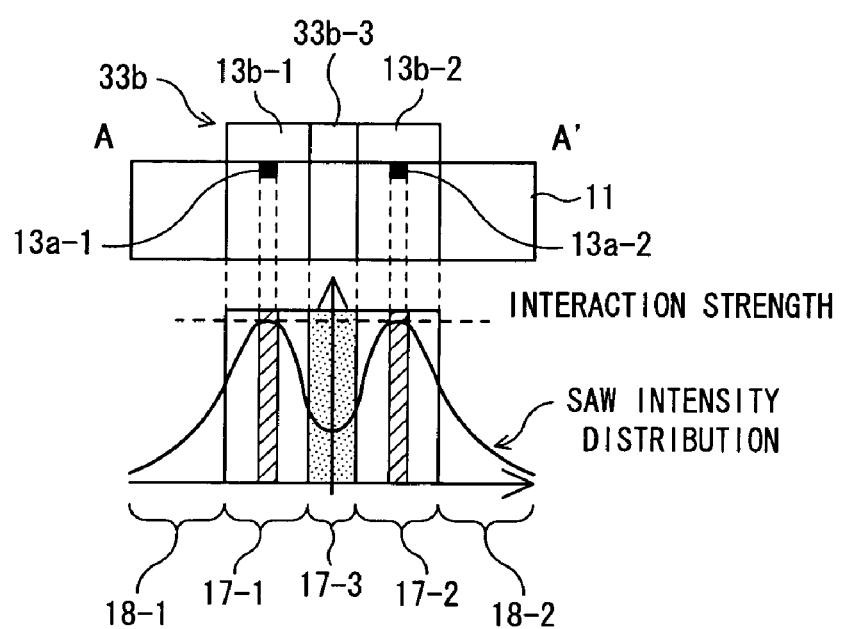
FIG. 10 is an illustration useful for explaining the operations and effects of the acousto-optic device according to the third embodiment of the present invention.

FIGS. 9 and 10 are illustrations of an acousto-optic device 30 according to a third embodiment of the present invention. FIG. 9 is a top view illustratively showing the acousto-optic device 30, and FIG. 10 is a cross-sectional view taken along an arrow line A–A' of FIG. 9 showing the acousto-optic device 30 and is an illustration of an intensity distribution of a surface acoustic wave from the transducer 15 in a direction perpendicular to the propagation direction on the substrate 11, and corresponds to FIGS. 2 and 6 respectively showing the first and second embodiments. In FIGS. 9 and 10, the same reference numerals as those in FIGS. 1 and 2 designate the almost same components.

Although the acousto-optic device 30 according to the third embodiment is also made such that, as well as the above-described first and second embodiments, the SAW propagation speed in the first and second areas 17-1 and 17-2 including the formation areas of the optical waveguides 13a-1 and 13a-2 is made to be lower than the propagation speed in the areas 17-3, 18-1 and 18-2 to make a difference in acoustic speed therebetween, the thin film structure of a third area 17-3 is different from that in each of the above-described embodiments.

Therefore, in the acousto-optic device 30 according to the third embodiment, as in the case of the acousto-optic devices 10 and 20 according to the first and second embodiments, the thin films 13b-1 and 13b-2 are formed as a SAW guide (surface acoustic wave distribution structure) 33b, but a difference from the acousto-optic devices 10 and 20 is that a thin film 33b-3 is made of a material different from those of the thin films 13b-1 and 13b-2.

That is, as the material of the thin films 13b-1 and 13b-2 formed in the first and second areas 17-1 and 17-2, there is used a substance lower in SAW propagation speed than an LN forming a substrate material, for example, a substance obtained by doping silicon dioxide with indium or tin, while as the material of the thin film 33b-3 to be formed in the third area 17-3, there can be used a substance higher in SAW propagation speed than the LN, for example, aluminum oxide, particularly, $Al_2O_3$, or the like. Incidentally, for the thin film, as a material higher in SAW propagation speed than the LN substrate, it is also possible to use a well-known substance.

In this case, a propagation speed difference (acoustic speed difference) larger than that in the case of the above-described embodiments can be made between the SAW propagation speed in the areas 17-1 and 17-2 in which the thin films 13b-1 and 13b-2 are formed and the SAW propagation speed in the thin film 33b-3 formed in the area 17-3 interposed between the areas 17-1 and 17-2.

That is, since the SAW propagation speed difference is made as mentioned above, in an SAW intensity distribution in a direction perpendicular to the propagation direction on the substrate 11, two maximum points can be formed at the positions corresponding to the optical waveguides 13a-1 and 13a-2, and the intensity distribution in an intermediate portion (see a central portion of the area 17-3) between the optical waveguides 13a-1 and 13a-2 can be made smaller than that in the case of the above-described embodiments and, hence, the intensity distribution at the aforesaid two maximum point portions can be made sharp.

Accordingly, also in the acousto-optic device 30 according to the third embodiment, owing to the thin films 13b-1, 13b-2 and 33b-3 being formed as a surface acoustic wave distribution structure, the SAW intensity distribution can be made so that two maximum points are formed at the positions corresponding to the optical waveguides 13a-1 and 13a-2, thus providing advantages similar to those of the above-described first embodiment, and the intensity distribution at the two maximum point portions can be made sharp, thus further enhancing the interaction efficiency between the propagating light and the SAW to greatly achieve the reduction of the dissipation of the driving power needed for the generation of the SAW.

[C2] Description of Modification of Third Embodiment

Figure 11:
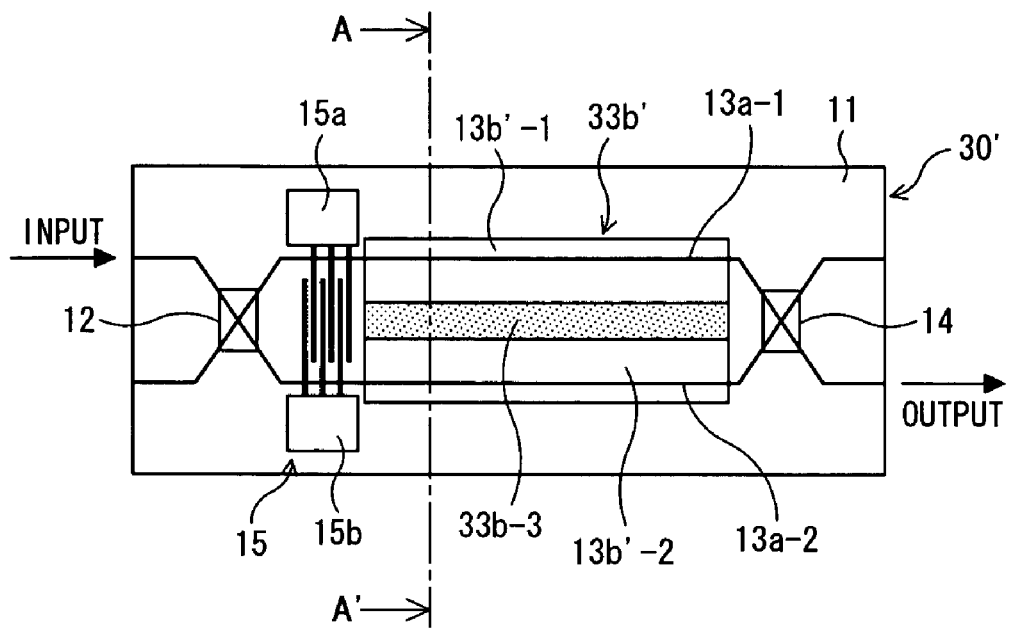
FIG. 11 is a top view illustratively showing an acousto-optic device according to a modification of the third embodiment of the present invention.
Figure 12:
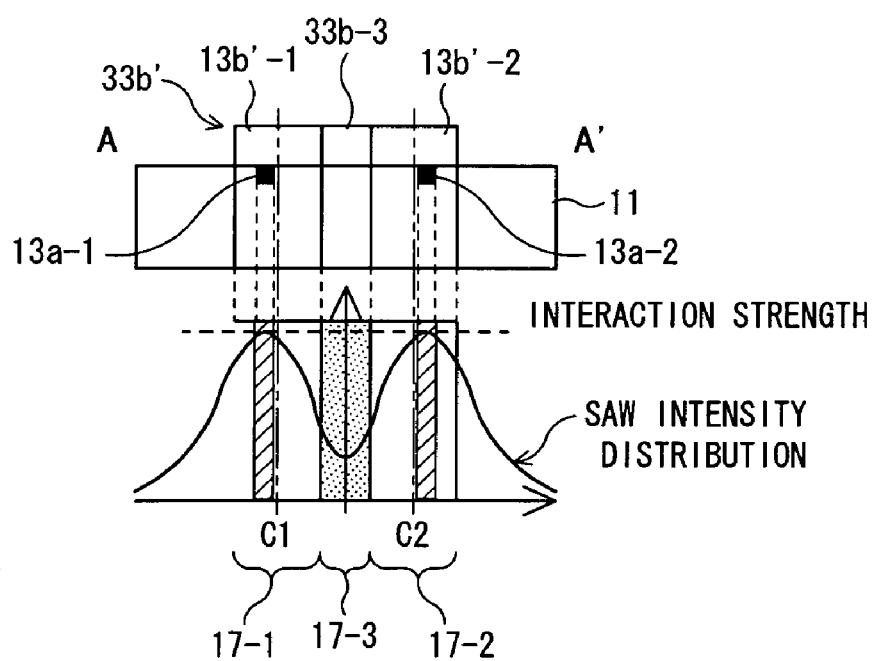
FIG. 12 is an illustration useful for explaining the operations and effects of the acousto-optic device according to the modification of the third embodiment of the present invention.

FIGS. 11 and 12 are illustrations of an acousto-optic device 30' according to a modification of the third embodiment of the present invention. FIG. 11 is a top view illustratively showing the acousto-optic device 30', and FIG. 12 is a cross-sectional view taken along an arrow line A–A' of FIG. 11 showing the acousto-optic device 30' and is an illustration of an intensity distribution of a surface acoustic wave from the transducer 15 in a direction perpendicular to the propagation direction on the substrate 11, and corresponds to FIG. 10 of the third embodiment. In FIGS. 11 and 12, the same reference numerals as those in FIGS. 9 and 10 designate the almost same components.

Although in the acousto-optic device 30 according to the third embodiment the thin films 13b-1 and 13b-2 constituting the SAW guide 33b are formed in a state where the formation positions of the optical waveguides 13a-1 and 13a-2 are taken as central axes, it is also appropriate that, as shown in FIGS. 11 and 12, thin films 13b'-1 and 13b'-2 constituting the SAW guide 33b 'are made in a state where positions shifted from the positions of the optical waveguides 13a-1 and 13a-2 to the inside or the outside (in this case, the inside) are set at central axes C1 and C2. In other words, if the SAW can efficiently be supplied to the optical waveguides 13a-1 and 13a-2, the thin films 13b'-1 and 13b'-2 can be formed without setting the formation positions of the optical waveguides 13a-1 and 13a-2 at the centers.

Also in this case, as shown in FIG. 12, the SAW intensity distribution can be made so that two maximum points are formed at the positions corresponding to the optical waveguides 13*a*-1 and 13*a*-2, thus providing advantages similar to those of the above-described third embodiment.

[D0] Description of Fourth Embodiment

Figure 13:
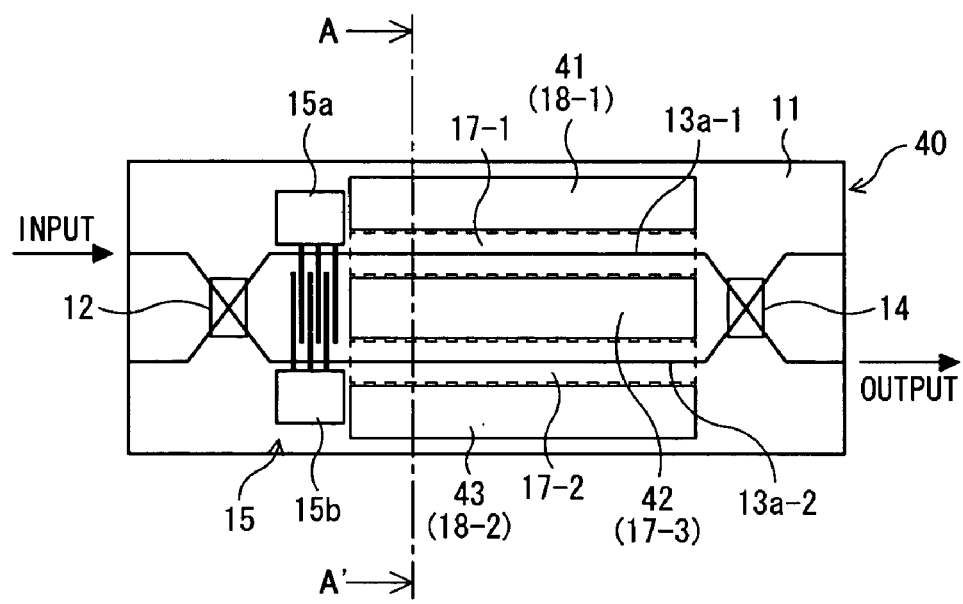
FIG. 13 is a top view illustratively showing an acousto-optic device according to a fourth embodiment of the present invention.
Figure 14:
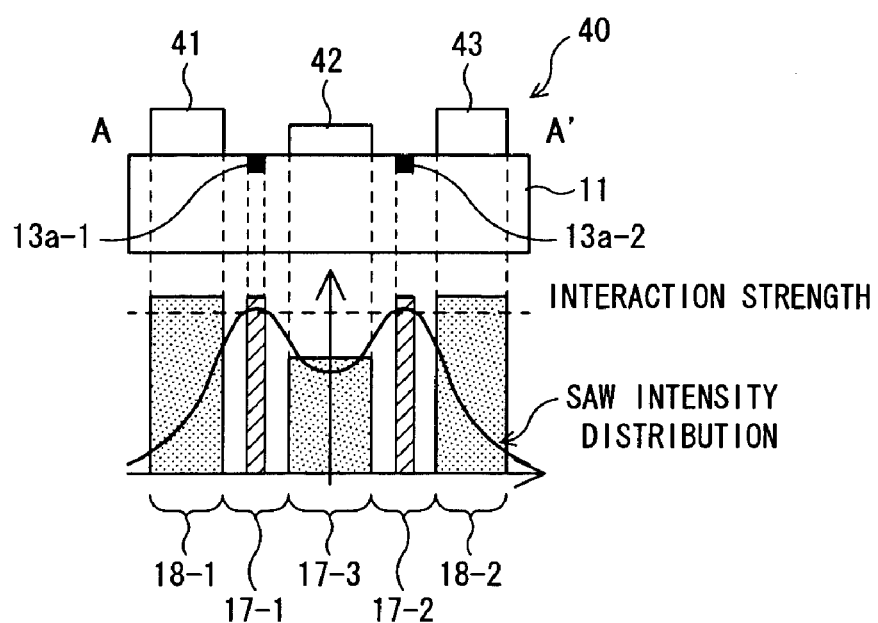
FIG. 14 is an illustration useful for explaining the operations and effects of the acousto-optic device according to the fourth embodiment of the present invention.

FIGS. 13 and 14 are illustrations of an acousto-optic device 40 according to a fourth embodiment of the present invention. FIG. 13 is a top view illustratively showing the acousto-optic device 40, and FIG. 14 is a cross-sectional view taken along an arrow line A–A' of FIG. 13 showing the acousto-optic device 40 and is an illustration of an intensity distribution of a surface acoustic wave from the transducer 15 in a direction perpendicular to the propagation direction on the substrate 11, and corresponds to FIGS. 2, 6 and 10 showing the first to third embodiments. In FIGS. 13 and 14, the same reference numerals as those in FIGS. 1 and 2 designate the almost same components.

Although the acousto-optic device 40 according to the fourth embodiment is also made such that, as well as the above-described first to third embodiments, the SAW propagation speed in the first and second areas 17-1 and 17-2 including the formation areas of the optical waveguides 13*a*-1 and 13*a*-2 is made to be lower than the propagation speed in the areas 17-3, 18-1 and 18-2 to make a difference in acoustic speed therebetween, a difference from the above-described embodiments is that thin films 41, 43 and 42 are provided in areas 18-1, 18-2 and 17-3, respectively, without forming thin films in the areas 17-1 and 17-2.

In other words, in the acousto-optic device 40, the SAW guide is comprised of the area 17-1 and 17-2 portions where no thin film is formed.

That is, in the acousto-optic device 40 according to the fourth embodiment, in the areas 17-3, 18-1 and 18-2 where the optical waveguides 13*a*-1 and 13*a*-2 are not formed, there are formed the thin films 42, 41 and 43 made of a substance which is lower in SAW propagation speed than the LN forming the material for the substrate 11. Thus, the SAW propagation speed in the first and second areas 17-1 and 17-2 including the areas of the formation of the optical waveguides 13*a*-1 and 13*a*-2 is made to be lower than the propagation speed in the areas 18-1, 18-2 and 17-3 in which the thin films 41 to 43 are formed, thereby making a difference in acoustic speed. Incidentally, as a substance for the formation of the thin films 41 to 43, there is, for example, aluminum oxide, preferably, $Al_2O_3$.

In addition, the thin film 42 in the area 17-3 is made to be smaller in thickness than the thin films 41 and 43, thereby providing an SAW propagation speed distribution almost similar to that of the above-described first embodiment (see FIG. 2). Thus, in the SAW intensity distribution in a direction perpendicular to the propagation direction on the substrate 11, two maximum points develops at the positions corresponding to the optical waveguides 13*a*-1 and 13*a*-2 as shown in FIG. 14.

In this connection, when the thickness of the thin film 42 is made to be almost identical to those of the thin films 41 and 43, it is also possible to obtain a SAW propagation speed distribution almost similar to that of the above-described second embodiment (see FIG. 6).

Therefore, also in the acousto-optic device 40 according to the fourth embodiment, owing to the thin films 41 to 43 being formed as a surface acoustic wave distribution structure, the SAW intensity distribution can be made so that two maximum points appear at the positions corresponding to the optical waveguides 13*a*-1 and 13*a*-2, thus providing advantages similar to those of the above-described first embodiment.

[E] Description of Fifth Embodiment

Figure 15:
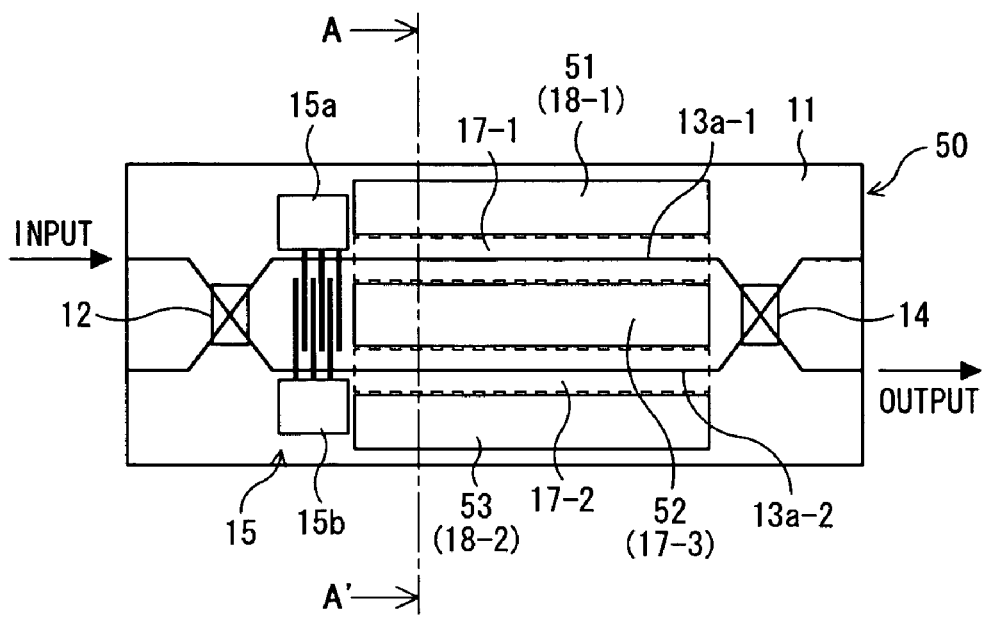
FIG. 15 is a top view illustratively showing an acousto-optic device according to a fifth embodiment of the present invention.
Figure 16:
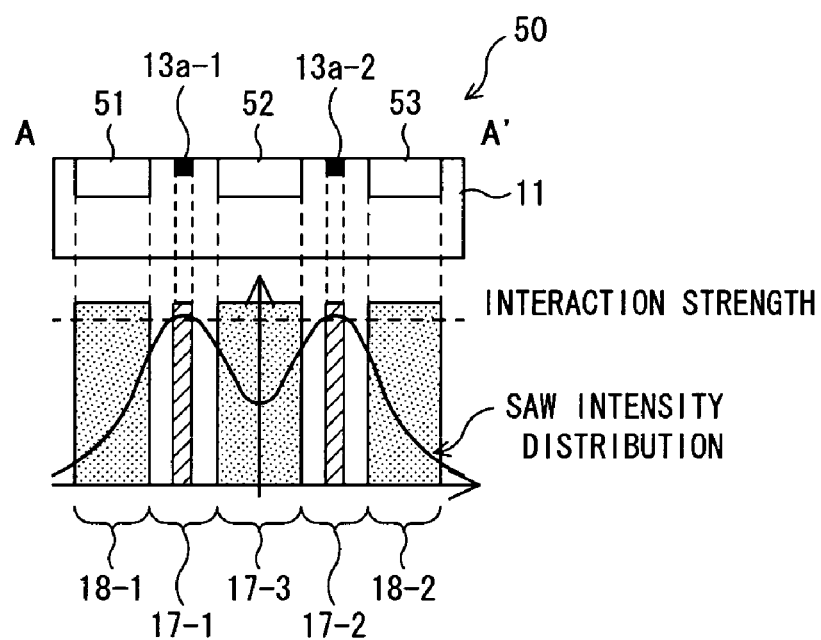
FIG. 16 is an illustration useful for explaining the operations and effects of the acousto-optic device according to the fifth embodiment of the present invention.

FIGS. 15 and 16 are illustrations of an acousto-optic device 50 according to a fifth embodiment of the present invention. FIG. 15 is a top view illustratively showing the acousto-optic device 50, and FIG. 16 is a cross-sectional view taken along an arrow line A–A' of FIG. 15 showing the acousto-optic device 50 and is an illustration of an intensity distribution of a surface acoustic wave from the transducer 15 in a direction perpendicular to the propagation direction on the substrate 11, and corresponds to FIGS. 2, 6, 10 and 14 showing the first to fourth embodiments. In FIGS. 15 and 16, the same reference numerals as those in FIGS. 1 and 2 designate the almost same components.

Although the acousto-optic device 50 according to the fifth embodiment is also made such that, as well as the above-described first to fourth embodiments, the SAW propagation speed in the first and second areas 17-1 and 17-2 including the formation areas of the optical waveguides 13*a*-1 and 13*a*-2 is made to be lower than the propagation speed in the areas 17-3, 18-1 and 18-2 to make a difference in acoustic speed therebetween, a difference from the above-described embodiments is that diffusion areas 51, 53 and 52 are provided in areas 18-1, 18-2 and 17-3, respectively, without forming thin films in the areas 17-1 and 17-2.

In other words, in the acousto-optic device 50, the SAW guide is comprised of the area 17-1 and 17-2 portions where no thin film is formed.

That is, in the acousto-optic device 50 according to the fifth embodiment, in the areas 17-3, 18-1 and 18-2 where the optical waveguides 13*a*-1 and 13*a*-2 are not formed, for diffusion are as 52, 51 and 53, a diffusion substance is diffused so that the SAW propagation speed becomes lower than that of the LN forming the substance of the substrate 11. Thus, the SAW propagation speed in the first and second areas 17-1 and 17-2 including the areas of the formation of the optical waveguides 13*a*-1 and 13*a*-2 is made to be lower than the propagation speed in the areas 18-1, 18-2 and 17-3 forming the diffusion areas 51, 53 and 52, thereby making a difference in acoustic speed. Incidentally, as a substance for the formation of the diffusion areas whereby the SAW propagation speed is made to be lower than that of the LN, there is titanium.

Therefore, also in the acousto-optic device 50 according to the fifth embodiment, owing to the diffusion areas 51 to 53 being formed as a surface acoustic wave distribution structure, the SAW intensity distribution can be made so that two maximum points appear at the positions corresponding to the optical waveguides 13*a*-1 and 13*a*-2, thus providing advantages similar to those of the above-described first embodiment.

[F] Description of Sixth Embodiment

Figure 17:
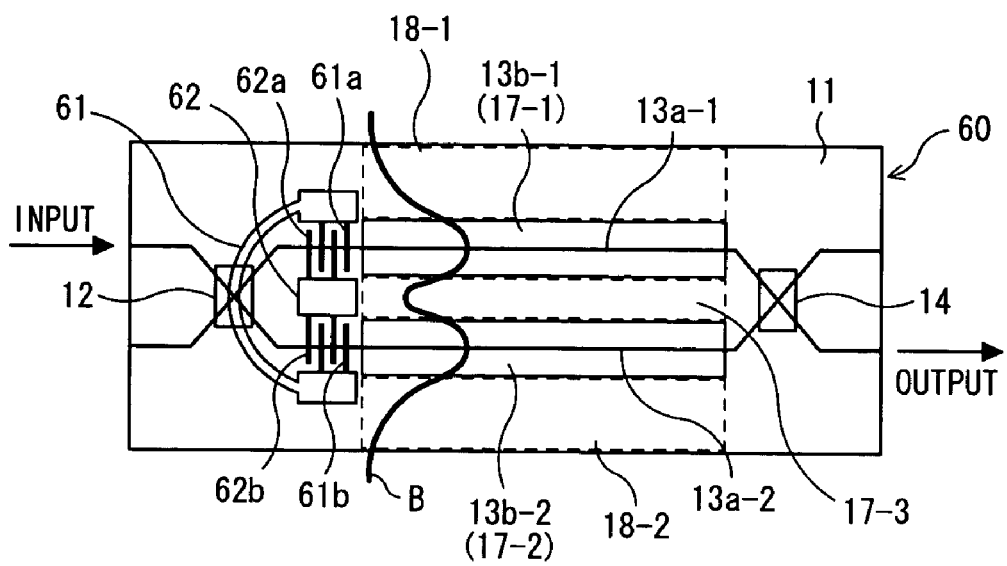
FIG. 17 is a top view illustratively showing an acousto-optic device according to a sixth embodiment of the present invention.
Figure 18:
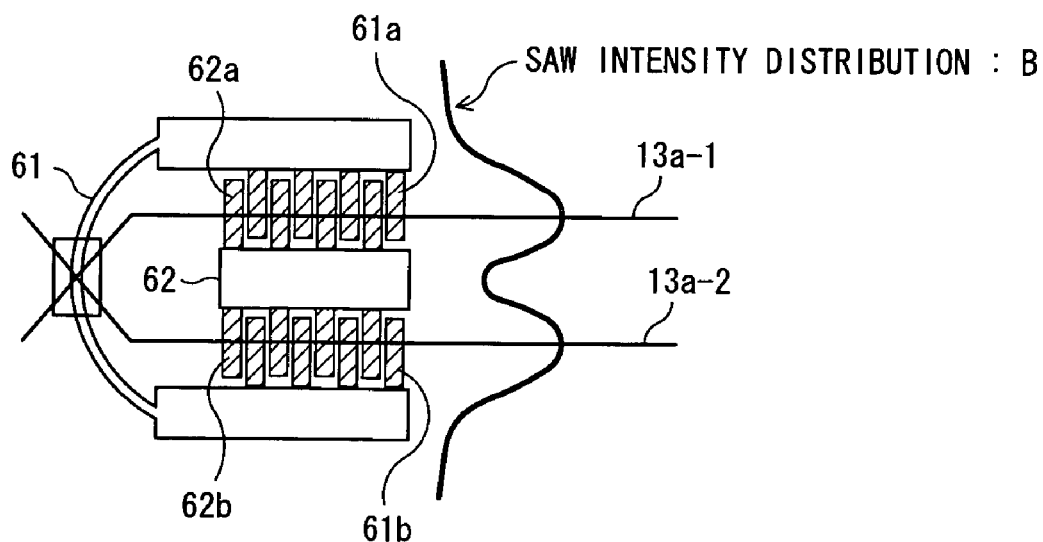
FIG. 18 is a top view illustratively showing an essential part of the acousto-optic device according to the sixth embodiment of the present invention.

FIGS. 17 and 18 are illustrations of an acousto-optic device 60 according to a sixth embodiment of the present invention. FIG. 17 is a top view illustratively showing the acousto-optic device 60, and FIG. 18 is an illustrative top view focusing on a structure of an IDT electrode unit 63 in the acoustic-optic device 60 shown in FIG. 17.

Although also in the acoustic-optic device 60 according to the sixth embodiment the SAW intensity distribution in a direction perpendicular to the propagation direction on the substrate 11 is made such that, as well as the above-described first to fifth embodiments, maximum points develop at two positions corresponding to the formation positions of the optical waveguides 13a-1 and 13a-2, the structure of the IDT electrode unit 63 serving as a transducer is different from the above-described embodiments.

The construction other than the IDT electrode unit 63 is similar to the construction including the SAW guide 23b in the above-described second embodiment. Moreover, a construction similar to those of the third to fifth embodiments is also applicable to the construction other than the IDT electrode unit 63. In the acoustic-optic device 60 according to the sixth embodiment, thin films 13b-1 and 13b-2 are formed in first and second areas 17-1 and 17-2 while no thin film is particularly formed in areas 17-3, 18-1 and 18-2 for the SAW propagation speed adjustment. In FIGS. 17 and 18, the same reference numerals as those in FIGS. 5 and 6 designate the almost same components.

In this case, the IDT electrode unit 63 is comprised of a base electrode 61 integrally formed to make contact between the optical waveguides 13a-1 and 13a-2 and a base electrode 62 formed to be interposed between the optical waveguides 13a-1 and 13a-2, and the base electrode 61 and pectinate electrodes 61a, 61b respectively hanging on the optical waveguides 13a-1, 13a-2 are formed integrally with each other, while the base electrode 62 and pectinate electrodes 62a, 62b respectively hanging on the optical waveguides 13a-1, 13a-2 are formed integrally with each other.

The pectinate electrodes 61a and 62a hanging on the optical waveguides 13a-1 are for generating an SAW propagating through the first area 17-1 including the optical waveguide 13a-1, while the pectinate electrodes 61b and 62b hanging on the optical waveguides 13a-2 are for generating an SAW propagating through the second area 17-2 including the optical waveguide 13a-2. In this case, the arrangement pattern of the pectinate electrodes 61a and 62a is the same as the arrangement pattern of the pectinate electrodes 61b and 62b and, hence, the phases of the SAWs respectively propagating through the areas 17-1 and 17-2 can be made to be in phase.

In addition, an electric signal having an acoustic frequency is supplied from an electric signal source (not shown) through the aforesaid base electrodes 61 and 62, and an SAW (first surface acoustic wave), which is propagated in the area 17-1, is produced by the pectinate electrodes 61a and 62a respectively connected to the base electrodes 61 and 62 and, likewise, an SAW (second surface acoustic wave), which is propagated in the area 17-2, is produced by the pectinate electrodes 61b and 62b respectively connected to the base electrodes 61 and 62.

Thus, as shown in FIGS. 17 and 18, in a SAW intensity distribution B in a direction perpendicular to the propagation direction on the substrate 11, a spot corresponding to the formation position of the optical waveguide 13a-1 can show a maximum point owing to the electric signal applied to the pectinate electrodes 61a and 62a, while a spot corresponding to the formation position of the optical waveguide 13a-2 can show a maximum point owing to the electric signal applied to the pectinate electrodes 61b and 62b.

In other words, the aforesaid base electrodes 61, 62 and the pectinate electrodes 61a, 62a organize a first pectinate electrode pair for making the first surface acoustic wave propagate in the first area 17-1, while the aforesaid base electrodes 61, 62 and the pectinate electrodes 61b, 62b organize a second pectinate electrode pair for making the second surface acoustic wave propagate in the second area 17-2. Moreover, the aforesaid construction of the IDT electrode unit 63 forms a surface acoustic wave distribution structure.

With the above-described construction, in the acousto-optic device 60 according to the sixth embodiment, after split into the TE light and the TM light by the polarization beam splitter 12, the light is propagated through the optical waveguide 13a-1 or the optical waveguide 13a-2. When a voltage signal with an ultrasonic frequency to be applied to the IDT electrode unit 63 is applied at this time, the TE light can be converted into the TM light, or the TM light can be converted into the TE light.

At this time, the intensity distribution of a surface acoustic wave to be produced by an electric signal applied to the base electrodes 61, 62 and the pectinate electrodes 61a, 62a of the IDT electrode unit 63 can be made such that an maximum point develops at the spot corresponding to the position of the optical waveguide 13a-1. Moreover, the intensity distribution of a surface acoustic wave to be produced by an electric signal applied to the base electrodes 61, 62 and the pectinate electrodes 61b, 62b of the IDT electrode unit 63 can be made such that an maximum point develops at the spot corresponding to the position of the optical waveguide 13a-2. Therefore, the SAW needed for the mode conversion in the optical waveguides 13a-1 and 13a-2 is obtainable when a voltage signal lower than a conventional one is supplied to the IDT electrode 63.

As described above, also in the acousto-optic device 60 according to the sixth embodiment, since the IDT electrode unit 63 serving as a transducer is formed as a surface acoustic wave distribution structure, the SAW intensity distribution is made such that two maximum points develop at the positions corresponding to the optical waveguides 13a-1 and 13a-2, thereby providing the advantages similar to those of the above-described first embodiment, and since the combination with the SAW guide structure in the above-described embodiments makes the intensity distribution at the two maximum point portions sharper, the efficiency of the interaction of the propagating light and the SAW is further improvable, so it is expectable to greatly achieve the reduction of dissipation of the driving power taken for the SAW generation.

[G1] Description of Seventh Embodiment

Figure 19:
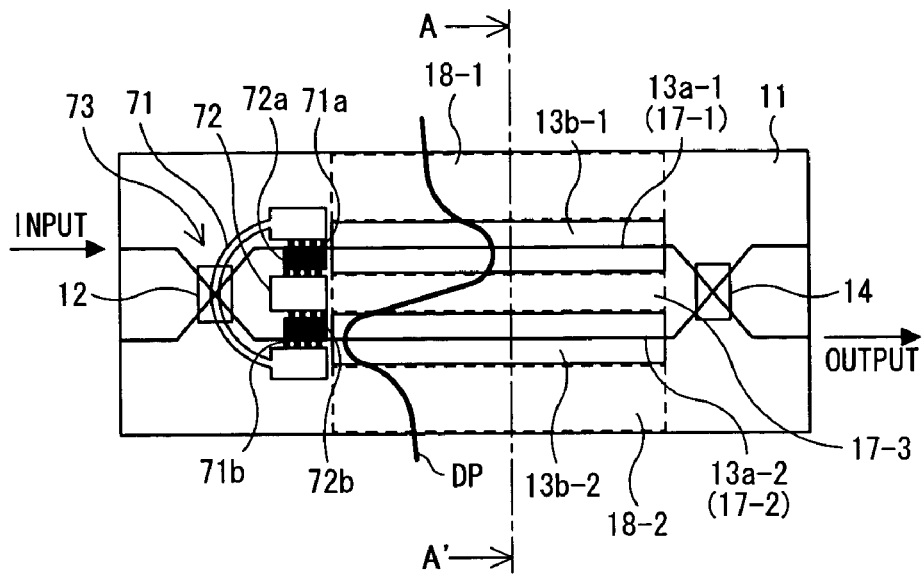
FIG. 19 is a top view illustratively showing an acousto-optic device according to a seventh embodiment of the present invention.
Figure 20:
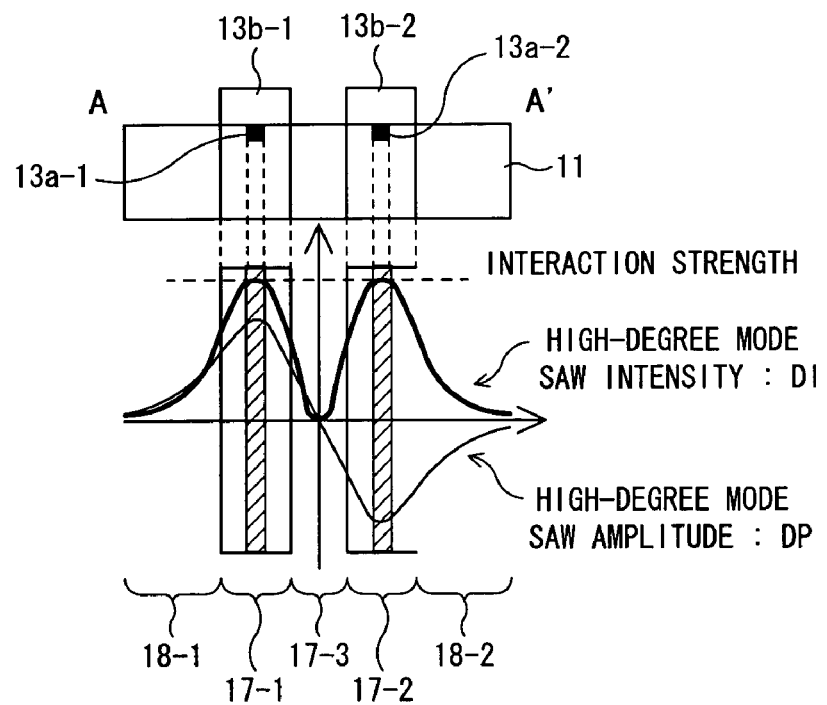
FIG. 20 is an illustration useful for explaining the operations and effects of the acousto-optic device according to the seventh embodiment of the present invention.
Figure 21:
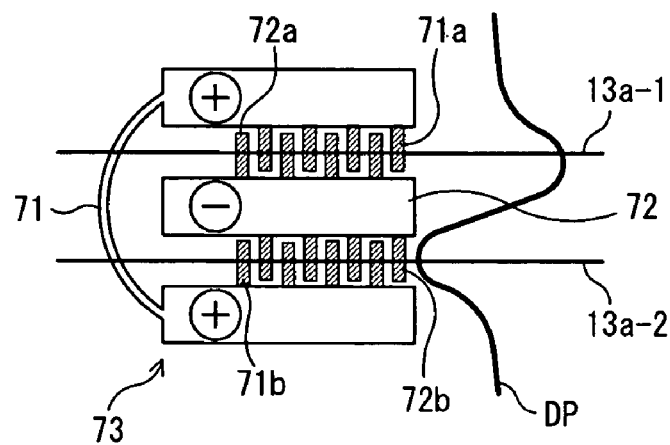
FIG. 21 is a top view illustratively showing an essential part of the acousto-optic device according to the seventh embodiment of the present invention.
Figure 22:
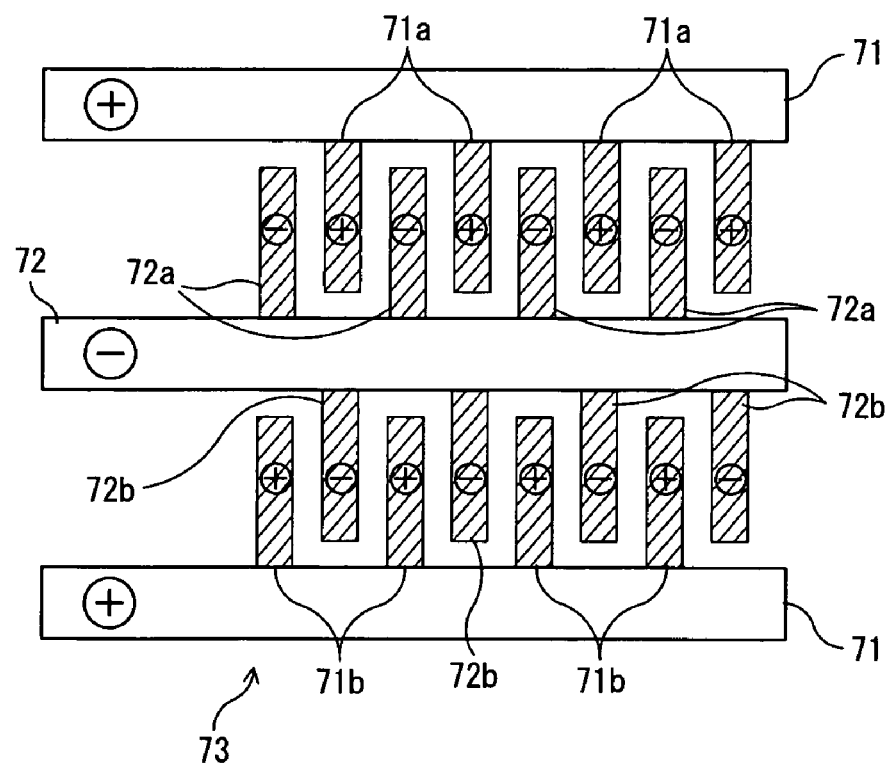
FIG. 22 is a top view illustratively showing an essential part of the acousto-optic device according to the seventh embodiment of the present invention.

FIGS. 19 to 22 are illustrations of an acousto-optic device 70 according to a seventh embodiment of the present invention. FIG. 19 is a top view illustratively showing the acousto-optic device 70, and FIG. 20 is a cross-sectional view taken along an arrow line A–A' of FIG. 19 showing the acousto-optic device 70 and is an illustration of an intensity distribution of a surface acoustic wave from an IDT electrode unit 73 in a direction perpendicular to the propagation direction on the substrate 11, and corresponds to FIGS. 2, 6, 10, 14 and 16 showing the first to fifth embodiments. FIGS. 21 and 22 are illustrative top views focusing on a structure of the IDT electrode unit 73 in the acousto-optic device 70 shown in FIG. 19.

Also in the acousto-optic device 70 according to the seventh embodiment, as in the case of the above-described sixth embodiment, although, owing to the IDT electrode unit 63 structure serving as a transducer, the SAW intensity distribution in a direction perpendicular to the propagation direction on the substrate 11 is made such that two spots corresponding to the formation portion of the optical waveguides 13a-1 and 13a-2 show a maximum point, the structure of the IDT electrode unit 73 differs from that of the sixth embodiment.

The construction other than the IDT electrode unit 73 is similar to the construction including the SAW guide 23b in the above-described second embodiment. Moreover, a construction similar to those of the first and third to fifth embodiments is also applicable to the construction other than the IDT electrode unit 73. In the acoustic-optic device 70 according to the seventh embodiment, the thin films 13b-1 and 13b-2 are formed in the first and second areas 17-1 and 17-2 while no thin film is particularly formed in areas 17-3, 18-1 and 18-2 for the SAW propagation speed adjustment. In FIGS. 19 to 22, the same reference numerals as those in FIGS. 5 and 6 designate the almost same components.

In this case, the IDT electrode unit 73 is comprised of a base electrode 71 integrally formed to make contact between the optical waveguides 13a-1 and 13a-2 and a base electrode 72 formed to be interposed between the optical waveguides 13a-1 and 13a-2, and the base electrode 71 and pectinate electrodes 71a, 71b respectively hanging on the optical waveguides 13a-1, 13a-2 are formed integrally with each other, while the base electrode 72 and pectinate electrodes 72a, 72b respectively hanging on the optical waveguides 13a-1, 13a-2 are formed integrally with each other.

The pectinate electrodes 71a and 72a hanging on the optical waveguides 13a-1 are for generating an SAW propagating through the first area 17-1 including the optical waveguide 13a-1, while the pectinate electrodes 71b and 72b hanging on the optical waveguides 13a-2 are for generating an SAW propagating through the second area 17-2 including the optical waveguide 13a-2. In this case, as shown in FIGS. 21 and 22, the arrangement pattern of the pectinate electrodes 71a and 72a and the arrangement pattern of the pectinate electrodes 71b and 72b are made to be contrary (inverse) to each other and, hence, the phases of the SAWs respectively propagating through the areas 17-1 and 17-2 can be made in an antiphase (reversed phase) relation to each other.

Thus, an electric signal is applied in a state where the base electrode 71 constituting the IDT electrode unit 73 is made as a positive electrode while the base electrode 72 is made as a negative electrode, thereby generating (exciting) an SAW. With respect to this SAW, the amplitude DP in a direction perpendicular to the propagation direction on the substrate 11 shows a higher order mode amplitude configuration. At this time, as shown in FIG. 20, the SAW intensity distribution DI in the direction perpendicular to the propagation direction on the substrate 11 is made by the electric signal applied to the pectinate electrodes 71a and 72a so that an maximum point develops at the place corresponding to the formation position of the optical waveguide 13a-1 while it is made by the electric signal applied to the pectinate electrodes 71b and 72b so that an maximum point develops at the place corresponding to the formation position of the optical waveguide 13a-2.

In other words, an electric signal having an acoustic frequency is supplied from an electric signal source (not shown) through the aforesaid base electrodes 71 and 72, and an SAW (first surface acoustic wave), which is propagated in the area 17-1, is produced by the pectinate electrodes 71a and 72a respectively connected to the base electrodes 71 and 72 and, likewise, an SAW (second surface acoustic wave), which is propagated in the area 17-2, is produced by the pectinate electrodes 71b and 72b respectively connected to the base electrodes 71 and 72.

That is, the aforesaid base electrodes 71, 72 and the pectinate electrodes 71a, 72a organize a first pectinate electrode pair for making the first surface acoustic wave propagate in the first area 17-1, while the aforesaid base electrodes 71, 72 and the pectinate electrodes 71b, 72b organize a second pectinate electrode pair for making the second surface acoustic wave propagate in the second area 17-2. Moreover, the aforesaid construction of the IDT electrode unit 73 forms a surface acoustic wave distribution structure.

With the above-described construction, in the acousto-optic device 70 according to the seventh embodiment, after split into the TE light and the TM light by the polarization beam splitter 12, the light is propagated through the optical waveguide 13a-1 or the optical waveguide 13a-2. When a voltage signal with an ultrasonic frequency to be applied to the IDT electrode unit 73 is applied at this time, the TE light can be converted into the TM light, or the TM light can be converted into the TE light.

At this time, the intensity distribution of a surface acoustic wave to be produced by an electric signal applied to the base electrodes 71, 72 and the pectinate electrodes 71a, 72a of the IDT electrode unit 73 can be made such that an maximum point develops at the spot corresponding to the position of the optical waveguide 13a-1. Moreover, the intensity distribution of a surface acoustic wave to be produced by an electric signal applied to the base electrodes 71, 72 and the pectinate electrodes 71b, 72b of the IDT electrode unit 73 can be made such that an maximum point develops at the spot corresponding to the position of the optical waveguide 13a-2. Therefore, the SAW needed for the mode conversion in the optical waveguides 13a-1 and 13a-2 is obtainable even if a voltage signal lower than a conventional one is supplied to the IDT electrode 73.

As described above, also in the acousto-optic device 70 according to the seventh embodiment, since the IDT electrode unit 73 serving as a transducer is formed as a surface acoustic wave distribution structure, the SAW intensity distribution is made such that two maximum points develop at the positions corresponding to the optical waveguides 13a-1 and 13a-2, thereby providing the advantages similar to those of the above-described first embodiment, and since the combination with the SAW guide structure in the above-described embodiments makes the intensity distribution at the two maximum point portions sharper, the efficiency of the interaction of the propagating light and the SAW is further improvable, so it is expectable to greatly achieve the reduction of dissipation of the driving power taken for the SAW generation.

[G2] Description of Modification of Seventh Embodiment

Figure 23:
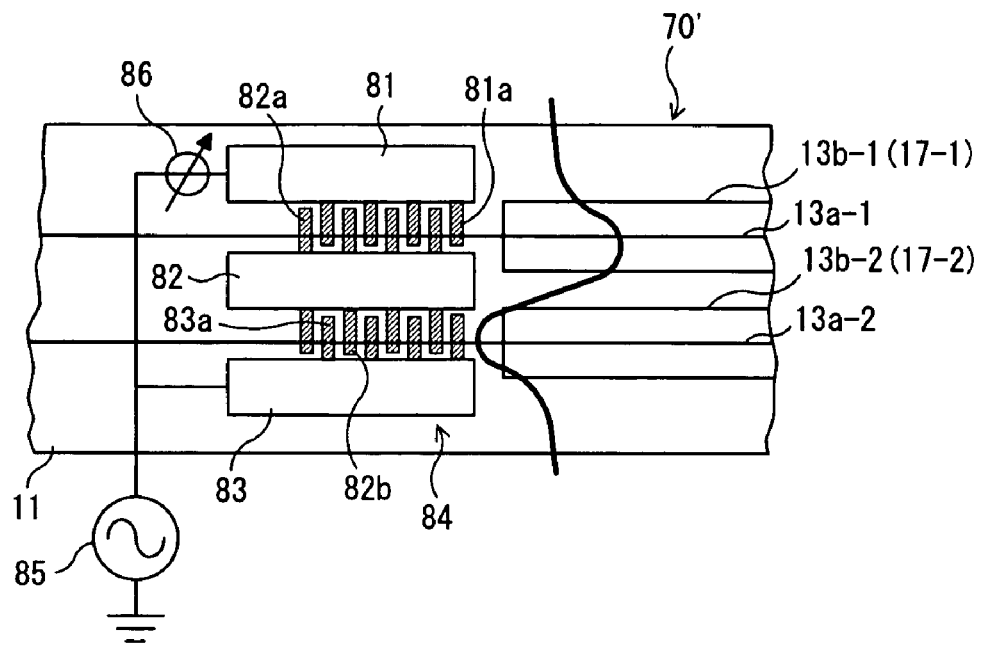
FIG. 23 is a top view illustratively showing an acousto-optic device according to a modification of the seventh embodiment of the present invention.
Figure 24:
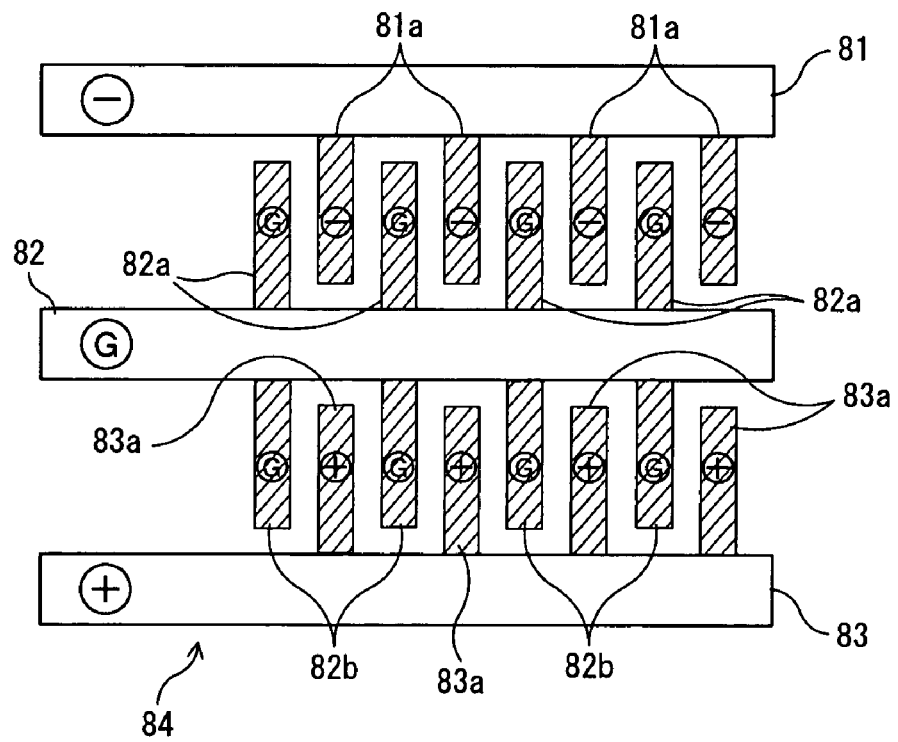
FIG. 24 is a top view illustratively showing an essential part of the acousto-optic device according to the modification of the seventh embodiment of the present invention.
Figure 25:
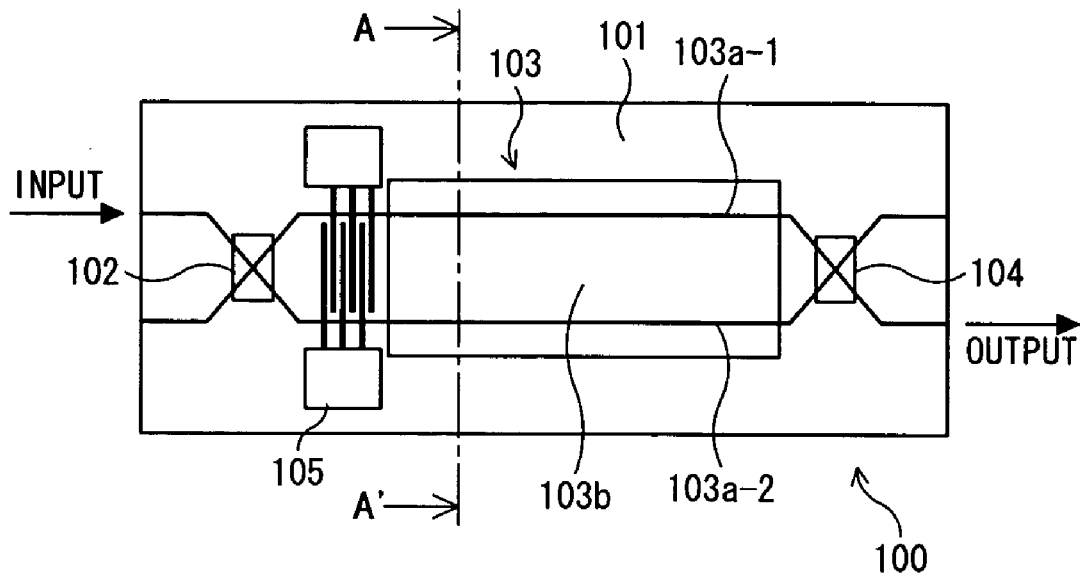
FIG. 25 is a top view illustratively showing an example of a configuration of a common AOTF.
Figure 26:
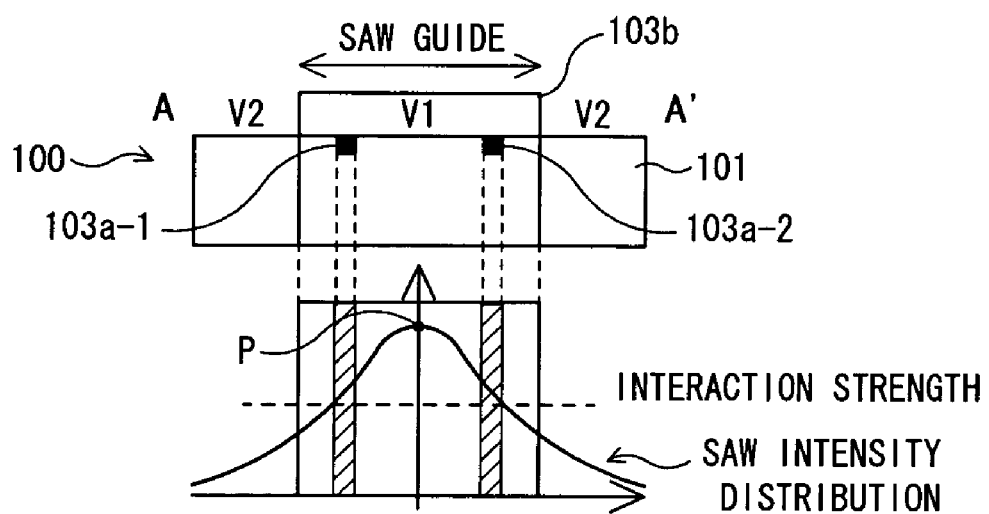
FIG. 26 is an illustration of a SAW intensity distribution in a direction perpendicular to a SAW propagation direction in the AOTF shown in FIG. 25.

FIGS. 23 and 24 are illustrations of an acousto-optic device 70' according to a modification of the seventh embodiment of the present invention. FIG. 23 is an illustrative top view focusing on an essential part thereof, and FIG. 24 is an illustrative top view focusing on a structure of an IDT electrode unit 84 of the acousto-optic device 70' shown in FIG. 23.

Although in the acousto-optic device 70 according to the seventh embodiment the arrangement pattern of the pectinate electrodes 71a and 72a and the arrangement pattern of the pectinate electrodes 71b and 72b are made to be contrary to each other to place the SAW to be generated into a higher order mode, when an electric signal source 85 and a phase shifter 86 shown in FIG. 23 is provided together with the IDT electrode unit 84 shown in FIGS. 23 and 24, the generation of a similar higher order mode SAW also becomes possible. In FIGS. 23 and 24, the same reference numerals as those in FIGS. 21 and 22 designate the almost same components.

The acousto-optic device 70' according to the modification of the seventh embodiment is equipped with base electrodes 81 and 83 respectively formed outside the optical waveguides 13a-1 and 13a-2 on the substrate 11 surface and a base electrode 82 formed at a place interposed between the optical waveguides 13a-1 and 13a-2, with pectinate electrodes 81a and 83a respectively hanging on the optical waveguides 13a-1 and 13a-2 being connected to the base electrodes 81 and 83 and pectinate electrodes 82a and 82b respectively hanging on the optical waveguides 13a-1 and 13a-2 being connected to the base electrode 82.

In addition, the pectinate electrodes 81a and 82a hanging on the optical waveguide 13a-1 is for producing an SAW (first surface acoustic wave) propagated through the first area 17-1 including this optical waveguide 13a-1, while the pectinate electrodes 82b and 83a hanging on the optical waveguide 13a-2 is for producing an SAW (second surface acoustic wave) propagated through the second area 17-2 including the optical waveguide 13a-2. That is, as shown in FIG. 24, this can produce the SAW, which acts on the light propagated through the optical waveguides 13a-1 and 13a-2, in a manner such that an electric signal is applied from the electric signal source 85, which will be mentioned later, in a state where the base electrodes 81 and 83 are made as positive electrodes and the base electrode 82 is made as a negative electrode.

In other words, the aforesaid base electrodes 81, 82 and the pectinate electrodes 81a, 82a organize a first pectinate electrode pair for making the first surface acoustic wave propagate in the first area 17-1, while the aforesaid base electrodes 82, 83 and the pectinate electrodes 82b, 83a organize a second pectinate electrode pair for making the second surface acoustic wave propagate in the second area 17-2. Incidentally, as shown in FIGS. 23 and 24, the arrangement pattern of the pectinate electrodes 81a and 82a and the arrangement pattern of the pectinate electrodes 82b and 83a are identical to each other.

Furthermore, the electric signal source 85 is made to generate an electric signal (having an ultrasonic frequency) to be applied to the IDT electrode 84 serving as a transducer. The electric signal generated in this electric signal source 85 is supplied through the base electrode 83 to the pectinate electrode 83a and is supplied to the phase shifter 86.

The phase shifter 86 is for placing the electric signals to be applied from the electric signal source 85 to the first and second pectinate electrode pairs into antiphase relation to each other. That is, the phase shifter 86 is for inverting the phase of the electric signal with an ultrasonic frequency from the electric signal source 85, with the phase-inverted electric signal being supplied through the base electrode 81 to the pectinate electrode 81a. Therefore, the electric signals to be supplied through the base electrodes 81 and 83 to the pectinate electrodes 81a and 83a are put into antiphase relation to each other.

Accordingly, an SAW is produced by applying the electric signals, which are in antiphase relation to each other, to the base electrodes 81 and 83 constituting the IDT electrode unit 84, and an amplitude DP of the SAW in a direction perpendicular to the propagation direction on the substrate 11 comes into a higher order mode amplitude shape similar to that shown in FIG. 20. In this case, an SAW intensity distribution DI in a direction perpendicular to the propagation direction on the substrate 11 can be made such that a maximum point develops at a spot corresponding to the formation place of the optical waveguide 13a-1 owing to the electric signal applied to the pectinate electrodes 81a and 82a and a maximum point develops at a spot corresponding to the formation place of the optical waveguide 13a-2 owing to the electric signal applied to the pectinate electrodes 82b and 83a.

That is, in the acousto-optic device 70' according to the modification of the seventh embodiment, as a surface acoustic wave distribution structure, there are provided the IDT electrode unit 84 including the pectinate electrodes 81a, 82a and the pectinate electrodes 82b, 83a which have the same arrangement patterns, the electric signal source 85 and the phase shifter 86.

Therefore, also in the acousto-optic device 70' according to the modification of the seventh embodiment, since the IDT electrode unit 84 serving as a transducer is made as a surface acoustic wave distribution structure, the SAW intensity distribution can be made such that two maximum points develop at the positions corresponding to the optical waveguides 13a-1 and 13a-2, thus providing advantages similar to those of the above-described first embodiment and, through the combination with the SAW guide structure in the above-described embodiments, the intensity distribution at the two maximum point portions can be made sharper, thus further enhancing the interaction efficiency between the propagating light and the SAW to greatly achieve the reduction of the dissipation of the driving power needed for the generation of the SAW.

[H] Others

It should be understood that the present invention is not limited to the above-described embodiments, and that it is intended to cover all changes and modifications of the embodiments of the invention herein which do not constitute departures from the spirit and scope of the invention.

For example, although in the above-described first to fifth embodiments the formation of thin films or the formation of diffusion areas on the substrate 11 is made so that the propagation speed of the SAW affecting the light propagating through the optical waveguides 13a-1 and 13a-2 is made relatively lower than that around them in the areas 17-1 and 17-2, the present invention is not limited to this, but it is also appropriate to employ both the thin films and diffusion areas.

In addition, it is also appropriate that, in the above-described first to fifth embodiments, the IDT electrode unit 63, 73 or 84 which forms the surface acoustic wave distribution structure according to the sixth or seventh embodiment is used in place of the transducer 15. In this case, it is expectable to achieve the further reduction of the dissipation of the driving power needed for the SAW generation.

Still additionally, although in the above-described embodiments the detailed description has been made of the device in which two optical waveguides are formed, the present invention is not limited to this but, also in a case in which more-than-two optical waveguides are formed on the substrate, it is possible that a surface acoustic wave distribution structure is made such that the intensity of the surface acoustic wave from the transducer in a direction perpendicular to the propagation direction on the substrate is distributed so as to become at a maximum at the spot corresponding to each of the positions of the optical waveguides.

Yet additionally, the above-described embodiments enable the manufacturing of the apparatus according to the present invention.

What is claimed is:

1. An acousto-optic device comprising:
   a substrate showing an acousto-optic effect;
   first and second optical waveguides formed on said substrate to be substantially parallel with each other for propagating light;
   a transducer formed on said substrate for producing a surface acoustic wave having a first intensity distribution in a direction perpendicular to directions of said first and second optical waveguides, said first intensity distribution including a single maximum point corresponding to a position interposed between said first and second optical waveguides; and
   a surface acoustic wave distribution structure for distributing an intensity of said surface acoustic wave propagating along said first and second optical waveguides so that the first intensity distribution is converted into a second intensity distribution in which maximum values develop at two points corresponding to positions of said first and second optical waveguides.

2. The acousto-optic device according to claim 1, wherein said surface acoustic wave distribution structure is made such that a speed of said surface acoustic wave propagated in first and second areas respectively including areas where said first and second optical waveguides are formed becomes lower than a speed of said surface acoustic wave propagated in a third area interposed between said first and second areas and a speed of said surface acoustic wave propagated in said first and second areas becomes lower than a speed of said surface acoustic wave propagated in both side areas lying with respect to said first and second areas.

3. The acousto-optic device according to claim 2, wherein a thin film is formed in each of said first and second areas so that a speed of said surface acoustic wave in each of said first and second areas becomes lower than a speed thereof in said third area.

4. The acousto-optic device according to claim 3, wherein said thin film to be formed in each of said first and second areas is made of a material obtained by doping silicon dioxide with indium or tin.

5. The acousto-optic device according to claim 4, wherein a thin film, made of a material obtained by doping silicon dioxide with indium or tin, is formed in said third area and said thin film in said third area is formed to be smaller in thickness than that of said thin film in each of said first and second areas.

6. The acousto-optic device according to claim 3, wherein said thin film to be formed in each of said first and second areas is made of a material obtained by doping silicon dioxide with indium or tin, and a thin film made of aluminum oxide is formed in said third area.

7. The acousto-optic device according to claim 2, wherein a thin film is formed in each of said both side areas on a surface of said substrate lying with respect to said first and second areas, and a thin film smaller in thickness than said thin film in each of said both side areas is formed in said third area, and each of said thin films in said both side areas and in said third area is made such that a propagation speed of said surface acoustic wave therein becomes higher than a propagation speed thereof in said substrate.

8. The acousto-optic device according to claim 2, wherein each of said third area and said both side areas on said substrate surface lying with respect to said first and second areas is made as a diffusion area, and said diffusion area of each of said third area and said both side areas on said substrate surface is made such that a propagation speed of said surface acoustic wave therein becomes higher than a propagation speed thereof in said substrate.

9. The acousto-optic device according to claim 1, wherein said transducer includes a first pectinate electrode pair formed at a position at which said surface acoustic wave is equally propagated with respect to said first and second areas.

10. The acousto-optic device according to claim 1, further comprising an electric signal source for applying an electric signal to said transducer.

11. The acousto-optic device according to claim 1, further comprising:
    a first polarization splitting element made to split light from at least one input port into two polarized waves for outputting the split lights to said first and second optical waveguides; and
    a second polarization splitting element made to receive light from said first and second optical waveguides for splitting said light from said first and second optical waveguides into two polarized waves and outputting said polarized waves.

12. An acousto-optic device comprising:
    a substrate showing an acousto-optic effect;
    first and second optical waveguides formed on said substrate to be substantially parallel with each other for propagating light;
    a transducer formed on said substrate for producing a surface acoustic wave propagated in a propagation direction along directions of said first and second optical waveguides; and
    a surface acoustic wave distribution structure for distributing an intensity of said surface acoustic wave in a direction perpendicular to said propagation direction on said substrate so that maximum values develop at two points corresponding to positions of said first and second optical waveguides,
    wherein as said surface acoustic wave distribution structure, said transducer includes a first pectinate electrode pair for making a first surface acoustic wave propagated in a first area including an area where said first optical waveguide is formed, and a second pectinate electrode pair for making a second surface acoustic wave propagated in a second area including an area where said second optical waveguide, and
    wherein electrode patterns of said first and second pectinate electrode pairs are made so that said first and second surface acoustic waves are in antiphase relation to each other.

13. An acousto-optic device comprising:
    a substrate showing an acousto-optic effect;
    first and second optical waveguides formed on said substrate to be substantially parallel with each other for propagating light;
    a transducer formed on said substrate for producing a surface acoustic wave propagated in a propagation direction along directions of said first and second optical waveguides; and
    a surface acoustic wave distribution structure for distributing an intensity of said surface acoustic wave in a direction perpendicular to said propagation direction on said substrate so that maximum values develop at two points corresponding to positions of said first and second optical waveguides, wherein as said surface acoustic wave distribution structure, said transducer includes a first pectinate electrode pair for making a first surface acoustic wave propagated in a first area including an area where said first optical waveguide is formed, and a second pectinate electrode pair for making a second surface acoustic wave propagated in a second area including an area where said second optical waveguide, the acousto-optic devicefurther comprising:

an electric signal source for applying an electric signal to said transducer; and a phase shifter for establishing antiphase relation between electric signals to be applied from said electric signal source to said first and second pectinate electrode pairs.

14. An acousto-optic device comprising:

a substrate showing an acousto-optic effect;

a plurality of optical waveguides formed on said substrate to be substantially parallel with each other for propagating light;

a transducer formed on said substrate for producing a surface acoustic wave having a first intensity distribution in a direction perpendicular to directions of said plurality of optical waveguides, said first intensity distribution including a single maximum point corresponding to a position interposed between said plurality of optical waveguides; and a surface acoustic wave distribution structure for distributing an intensity of said surface acoustic wave from said transducer propagating along said plurality of optical waveguides so that the first intensity distribution is converted into a second intensity distribution in which a maximum value develops at points corresponding to each of positions of said plurality of optical waveguides.

15. An acousto-optic device comprising:

a substrate showing an acousto-optic effect;

a plurality of optical waveguides formed on said substrate to be substantially parallel with each other for propagating light; and a transducer formed on said substrate for producing a surface acoustic wave to be propagated in a propagation direction along directions of said plurality of optical waveguides, an amplitude of said surface acoustic wave from said transducer in a direction perpendicular to said propagation direction on said substrate being placed into a higher order mode, and two points corresponding to positions of first and second optical waveguides of said plurality of optical waveguides being set at one of maximum and minimum of said amplitude, wherein said transducer includes:

a first pectinate electrode pair for making a first surface acoustic wave to be propagated in a first area including an area where a first optical waveguide of said plurality of said waveguides is formed; and a second pectinate electrode pair for making a second surface acoustic wave to be propagated in a second area including an area where a second optical waveguide of said plurality of optical waveguides is formed, and electrode patterns of said first and second pectinate electrode pairs are made so that said first and second surface acoustic waves are in antiphase relation to each other.

16. An acousto-optic device comprising:

a substrate having an acousto-optic effect;

a plurality of optical waveguides formed on said substrate to be substantially parallel with each other for propagating light; and a transducer formed on said substrate for producing a surface acoustic wave to be propagated in a propagation direction along directions of said plurality of optical waveguides, an amplitude of said surface acoustic wave from said transducer in a direction perpendicular to said propagation direction on said substrate being placed into a higher order mode, and two points corresponding to positions of first and second optical waveguides of said plurality of optical waveguides being set at one of maximum and minimum of said amplitude, wherein said transducer includes:

a first pectinate electrode pair for making a first surface acoustic wave to be propagated in a first area including an area where a first optical waveguide of said plurality of optical waveguides is formed; and a second pectinate electrode pair for making a second surface acoustic wave to be propagated in a second area including an area where a second optical waveguide of said plurality of optical waveguides is formed, and said acousto-optic device further comprises:

an electric signal source for applying an electric signal to said transducer; and a phase shifter for establishing antiphase relation between electric signals to be applied from said electric signal source to said first and second pectinate electrode pairs.

17. An acousto-optic device comprising:

a substrate having an acousto-optic effect;

first and second optical waveguides formed on said substrate to be substantially parallel with each other for propagating light;

a transducer formed on said substrate for producing a surface acoustic wave propagated in a propagation direction along directions of said first and second optical waveguides; and a surface acoustic wave distribution structure for distributing an intensity of said surface acoustic wave in a direction perpendicular to said propagation direction on said substrate so that maximum values develop at two points corresponding to positions of said first and second optical waveguides, wherein said surface acoustic wave distribution structure is made such that a speed of said surface acoustic wave propagated in first and second areas respectively including areas where said first and second optical waveguides are formed becomes lower than a speed of said surface acoustic wave propagated in a third area interposed between said first and second areas and a speed of said surface acoustic wave propagated in said first and second areas becomes lower than a speed of said surface acoustic wave propagated in both side areas lying with respect to said first and second areas, wherein a thin film is formed in each of said first and second areas so that a speed of said surface acoustic wave in each of said first and second areas becomes lower than a speed thereof in said third area and said thin film is made of a material obtained by doping silicon dioxide with indium or tin and wherein a thin film, made of a material obtained by doping silicon dioxide with indium or tin, is formed in said third area and said thin film in said third area is formed to be smaller in thickness than that of said thin film in each of said first and second areas.

18. An acousto-optic device comprising:

a substrate having an acousto-optic effect;

first and second optical waveguides formed on said substrate to be substantially parallel with each other for propagating light;

a transducer formed on said substrate for producing a surface acoustic wave propagated in a propagation direction along directions of said first and second optical waveguides; and a surface acoustic wave distribution structure for distributing an intensity of said surface acoustic wave in a direction perpendicular to said propagation direction on said substrate so that maximum values develop at two points corresponding to positions of said first and second optical waveguides, wherein said surface acoustic wave distribution structure is made such that a speed of said surface acoustic wave propagated in first and second areas respectively including areas where said first and second optical waveguides are formed becomes lower than a speed of said surface acoustic wave propagated in a third area interposed between said first and second areas and a speed of said surface acoustic wave propagated in said first and second areas becomes lower than a speed of said surface acoustic wave propagated in both side areas lying with respect to said first and second areas, wherein a thin film is formed in each of said first and second areas so that a speed of said surface acoustic wave in each of said first and second areas becomes lower than a speed thereof in said third area and said thin film to be formed in said first and second areas is made of a material obtained by doping silicon dioxide with indium or tin, and a thin film made of aluminum oxide is formed in said third area.

19. An acousto-optic device comprising:

a substrate having an acousto-optic effect;

first and second optical waveguides formed on said substrate to be substantially parallel with each other for propagating light;

a transducer formed on said substrate for producing a surface acoustic wave propagated in a propagation direction along directions of said first and second optical waveguides; and a surface acoustic wave distribution structure for distributing an intensity of said surface acoustic wave in a direction perpendicular to said propagation direction on said substrate so that maximum values develop at two points corresponding to positions of said first and second optical waveguides, wherein said surface acoustic wave distribution structure is made such that a speed of said surface acoustic wave propagated in first and second areas respectively including areas where said first and second optical waveguides are formed becomes lower than a speed of said surface acoustic wave propagated in a third area interposed between said first and second areas and a speed of said surface acoustic wave propagated in said first and second areas becomes lower than a speed of said surface acoustic wave propagated in both side areas lying with respect to said first and second areas, wherein a thin film is formed in each of said both side areas on a surface of said substrate lying with respect to said first and second areas, and a thin film smaller in thickness than said thin film in each of said both side areas is formed in said third area, and each of said thin films in said both side areas and in said third area is made such that a propagation speed of said surface acoustic wave therein becomes higher than a propagation speed thereof in said substrate.

* * * * *

UNITED STATES PATENT AND TRADEMARK OFFICE
CERTIFICATE OF CORRECTION

PATENT NO.         : 7,062,109 B2  
APPLICATION NO. : 10/954305  
DATED                 : June 13, 2006  
INVENTOR(S)        : Yukito Tsunoda et al.

It is certified that error appears in the above-identified patent and that said Letters Patent is hereby corrected as shown below:

Col. 21, line 9, delete "devicefurther" and insert --device further--, therefor.

Signed and Sealed this

Twenty-first Day of November, 2006

JON W. DUDAS  
*Director of the United States Patent and Trademark Office*